US010792614B2

(12) United States Patent
Deuerlein et al.

(10) Patent No.: US 10,792,614 B2
(45) Date of Patent: Oct. 6, 2020

(54) PROCESS AND APPARATUS FOR TREATMENT OF GAS STREAMS CONTAINING NITROGEN OXIDES

(71) Applicant: BASF SE, Ludwigshafen (DE)

(72) Inventors: Stephan Deuerlein, Ludwigshafen (DE); Stefan Maurer, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/376,700

(22) PCT Filed: Feb. 6, 2013

(86) PCT No.: PCT/IB2013/050985
§ 371 (c)(1),
(2) Date: Aug. 5, 2014

(87) PCT Pub. No.: WO2013/118064
PCT Pub. Date: Aug. 15, 2013

(65) Prior Publication Data
US 2015/0030515 A1 Jan. 29, 2015

(30) Foreign Application Priority Data
Feb. 6, 2012 (EP) .................................... 12154075

(51) Int. Cl.
B01D 53/94 (2006.01)
B01D 53/86 (2006.01)
B01J 29/76 (2006.01)
B01J 29/70 (2006.01)
B01J 37/06 (2006.01)
B01J 35/00 (2006.01)
C01B 39/46 (2006.01)

(52) U.S. Cl.
CPC ..... *B01D 53/9413* (2013.01); *B01D 53/8628* (2013.01); *B01D 53/9418* (2013.01); *B01D 53/9427* (2013.01); *B01J 29/7007* (2013.01); *B01J 29/7615* (2013.01); *B01J 35/002* (2013.01); *B01J 37/06* (2013.01); *C01B 39/46* (2013.01); *B01D 2251/202* (2013.01); *B01D 2251/204* (2013.01); *B01D 2251/208* (2013.01); *B01D 2255/502* (2013.01); *B01D 2257/402* (2013.01); *B01D 2257/404* (2013.01); *B01D 2258/0283* (2013.01); *Y02C 20/10* (2013.01); *Y02P 20/153* (2015.11)

(58) Field of Classification Search
None
See application file for complete search history.

(56) References Cited

U.S. PATENT DOCUMENTS

| 5,869,013 A * | 2/1999 | Tabata ............... B01D 53/9418 423/239.2 |
| 6,150,291 A | 11/2000 | Deeba et al. |
| 7,393,512 B2 | 7/2008 | Schwefer et al. |
| 7,744,839 B2 | 6/2010 | Schwefer et al. |
| 2002/0113015 A1* | 8/2002 | Carati ..................... B01J 29/06 210/638 |
| 2003/0143142 A1* | 7/2003 | Schwefer ........... B01D 53/8628 423/239.2 |
| 2004/0110627 A1 | 6/2004 | Schwefer et al. |
| 2005/0244320 A1 | 11/2005 | Schwefer et al. |
| 2006/0051277 A1 | 3/2006 | Schwefer et al. |
| 2007/0081934 A1* | 4/2007 | Hubig ................ B01D 53/9481 423/239.1 |
| 2008/0196399 A1* | 8/2008 | Nakatsuji .............. F01N 3/0807 60/299 |
| 2010/0196221 A1* | 8/2010 | Ando ................... B01D 53/925 422/171 |
| 2010/0275584 A1* | 11/2010 | Wada ................. B01D 53/9495 60/285 |
| 2010/0284876 A1* | 11/2010 | Augustine .......... B01D 53/9418 423/239.1 |
| 2011/0072790 A1* | 3/2011 | Schmieg ................ F01N 3/106 60/277 |
| 2011/0158877 A1* | 6/2011 | Pieterse ............... B01D 53/865 423/239.2 |

(Continued)

FOREIGN PATENT DOCUMENTS

| CN | 1182376 | 5/1998 |
| CN | 1439457 | 3/2003 |

(Continued)

OTHER PUBLICATIONS

PCT International Search Report in PCT/IB2013/050985, dated Jul. 4, 2013, 3 pages.

(Continued)

*Primary Examiner* — Sheng H Davis
(74) *Attorney, Agent, or Firm* — Oblon, McClelland, Maier & Neustadt, L.L.P.

(57) ABSTRACT

Described is a process for the treatment of a gas stream containing nitrogen oxides. The process comprises the steps of:

(1) providing a gas stream containing one or more nitrogen oxides;
(2) contacting the gas stream provided in step (1) with a transition metal containing zeolitic material having a BEA-type framework structure for reacting one or more of the nitrogen oxides; wherein the zeolitic material is obtainable from an organotemplate-free synthetic process. Also described is an apparatus for the treatment of a gas stream comprising containing nitrogen oxides.

17 Claims, 2 Drawing Sheets

(56) References Cited

U.S. PATENT DOCUMENTS

| | | | | |
|---|---|---|---|---|
| 2011/0197569 A1* | 8/2011 | Salanta | ................... | F01N 3/206 60/286 |
| 2011/0286914 A1* | 11/2011 | Li | ..................... | B01D 53/9418 423/700 |
| 2012/0087851 A1* | 4/2012 | Deuerlein | .......... | B01D 53/8628 423/239.2 |
| 2013/0149225 A1* | 6/2013 | Schwefer | ........... | B01D 53/8628 423/239.2 |
| 2013/0230441 A1* | 9/2013 | Hihara | ............... | B01D 53/9418 423/213.5 |

FOREIGN PATENT DOCUMENTS

| | | | |
|---|---|---|---|
| CN | 1658956 A | | 8/2005 |
| CN | 102240570 | | 11/2011 |
| DE | 10-112396 | | 10/2002 |
| DE | 10-226461 | | 1/2004 |
| DE | 10-2005-022650 | | 11/2006 |
| EP | 2072128 | * | 4/2008 |
| EP | 2 067 746 | | 6/2009 |
| JP | 2005-527350 A | | 9/2005 |
| KR | 10-0910932 B1 | | 8/2009 |
| WO | WO03/084646 | | 10/2003 |
| WO | WO-03/084646 | | 10/2003 |
| WO | 2004094045 | * | 11/2004 |
| WO | WO-2010/145077 | | 12/2010 |
| WO | WO-2010/146156 | | 12/2010 |
| WO | 2011151006 | * | 12/2011 |
| WO | WO-2011/157839 | | 12/2011 |
| WO | 2012090557 | * | 7/2012 |

OTHER PUBLICATIONS

PCT International Preliminary Report on Patentability in PCT/IB2013/050985, dated Aug. 21, 2014, 5 pages.

Ying, Wan, et al., Research and Development of Metallic Molecular Sieve Containing NOx Selective Catalytic Reduction I: Non-Noble Metal Containing Molecular Sieve System, *Molecule Catalyzation* vol. 16 No. 2 Apr. 30, 2002, 9 pages.

Ying, Wan, et al., Research and Development of Metallic Molecular Sieve Containing NOx Selective Catalytic Reduction I: Non-Noble Metal Containing Molecular Sieve System, *Molecule Catalyzation* vol. 16 No. 2 Apr. 30, 2002, 20 pages.

Cho, C.P, et al. "$No_x$ Reduction and $N_2O$ Emissions in a Diesel Engine Exhaust Using Fe-Zeolite and Vanadium Based SCR Catalysts," *Elsevier, Applied Thermal Engineering*, 2017, vol. 110, pp. 18-24.

Devadas, M., et al., "Influence of $NO_2$ on the Selective Catalytic Reduction of NO With Ammonia Over Fe-ZSM5," *Elsevier, Science Direct*, 2006, pp. 187196.

Henry, C., et al., $N_2O$ Emissions From 2010 SCR Systems, *US Department of Energy, Deer 2011*, pp. 1-20.

Lisi, L., et al. "Nitrates and Nitrous Oxide Formation During the Interaction of Nitrogen Oxides With Cu-ZSM-5 at low Temperature," Elsevier, *Applied Catalysis A: General*, 2012, vol. 413-144, pp. 117-131.

European Search Report for European Application No. EP 13 74 6187, dated Sep. 17, 2015, 6 pages.

\* cited by examiner

PROCESS AND APPARATUS FOR TREATMENT OF GAS STREAMS CONTAINING NITROGEN OXIDES

CROSS-REFERENCE TO RELATED APPLICATIONS

This application is the National State entry of PCT/IB2013/050985, filed on Feb. 6, 2013, which claims priority to European Application 12154075.1, filed on Feb. 6, 2012, the disclosures of which are incorporated herein by reference in their entireties.

TECHNICAL FIELD

The present invention relates to a process for the treatment of gas streams containing nitrogen oxides and in particular to the treatment of gas streams containing $N_2O$ and/or $NO_x$. Furthermore, the present invention relates to an apparatus used in the treatment of a gas stream containing nitrogen oxides and in particular containing $NO_x$ and/or $N_2O$.

BACKGROUND

In the field of exhaust gas treatment and in particular in the treatment of exhaust gas streams containing nitrogen oxides, considerable attention has been given to exhaust gas streams containing both $NO_x$ and $N_2O$. In such cases, the abatement of $N_2O$ in such exhaust gas streams is just as important as the removal of $NO_x$ therein, for example by selective catalytic reduction (SCR). This applies in particular in view of the fact that $N_2O$ is a potent greenhouse gas of which the capacity of heating the atmosphere is about 310 times as high as that of the prominent greenhouse gas $CO_2$. As a result thereof, avoiding $N_2O$ emissions is of particular importance in the current struggle against the greenhouse effect. This is well reflected by the fact that $N_2O$ emissions are currently taken into account in $CO_2$ emissions trading. Furthermore, emission thresholds are currently being prepared in several nations with respect to dinitrogen monoxide emissions.

According to current exhaust gas treatment technology, the abatement of $NO_x$ and $N_2O$ is performed separately. Thus, in a typical process for the treatment of $NO_x$ and $N_2O$ exhaust gases, $N_2O$ is thermally decomposed at temperatures greater than 400° C. in a first catalytic process after which $NO_x$ is then treated by selective catalytic reduction using ammonia for its transformation to nitrogen and water. In an alternative process, $NO_x$ is initially treated by selective catalytic reduction for its removal after which $N_2O$ is selectively reacted for its abatement. An advantage of the latter process is that it may be performed at lower temperatures, and in particular at temperatures ranging from 300-450° C.

In both instances, transition metal containing zeolites are typically used as catalysts for the abatement of $N_2O$, in particular since such catalysts show a high resistance towards water and oxygen typically contained in the gas streams to be treated. This is particularly valid for iron containing zeolite systems, of which the catalytic activity may be further enhanced by steam treatment thereof leading to the dealumination of the zeolite framework. Such zeolites not only display high activities, but furthermore allow for the abatement of $N_2O$ by reaction thereof to nitrogen and oxygen in the presence of $NO_x$ acting as a co-catalyst. Thus, DE 10112396 A1, DE 10226461 A1 and DE 10 2005 022650 A1 respectively disclose a two-step treatment process for exhaust gases containing $NO_x$ and $N_2O$ wherein $N_2O$ is abated in a first step employing an iron zeolite catalyst, after which $NO_x$ is then decomposed in a subsequent selective catalytic reduction treatment using ammonia as a reducing agent in the presence of a further zeolite catalyst containing iron.

Regarding the treatment of $NO_x$ in exhaust gas streams, ammonia remains the first choice as a reductant in the selective catalytic reduction used therein. In particular, remarkably high selectivities may be achieved for the reaction of $NO_x$ with $NH_3$ when using ammonia as the SCR-reductant. Although other reducing agents and in particular hydrogen and hydrocarbons have been examined as alternatives, said reducing agents are too reactive such that a major portion thereof unselectively reacts with oxygen in the gas mixtures to be treated.

As regards $N_2O$ abatement, on the other hand, this may be achieved using a wider range of reducing agents, which for example include hydrogen, carbon monoxide, ammonia, and hydrocarbons. Said reactions for the abatement of $N_2O$, however, require the complete removal of any $NO_x$ present in the gas stream to be treated since already traces thereof may lead to the deactivation and loss of selectivity of the transition metal containing zeolite catalysts which are employed therein. WO 03/084646 A1, for example, discloses a two-step process for the treatment of exhaust gases containing $NO_x$ and $N_2O$, wherein a nitrogen containing reducing agent is employed in a first step for completely removing $NO_x$ using selective catalytic reduction, followed by $N_2O$ abatement in a second step of catalytic reduction employing hydrocarbons, carbon monoxide and/or hydrogen as a reducing agent.

Accordingly, there remains a need for an improved process for the treatment of exhaust gas streams containing $NO_x$ and $N_2O$, in particular both with respect to the number of catalytic steps which are required, as well as with respect to the types of reducing agents used therein. This applies in particular in view of the numerous applications, for example in industrial production, power plants, or automotive transportation in which large amounts of these eminently harmful gases are produced.

SUMMARY

Embodiments of a first aspect of the present invention are directed to a process for the treatment of a gas stream containing nitrogen oxides. In a first embodiment, the process comprises the steps of: (1) providing a gas stream containing one or more nitrogen oxides; (2) contacting the gas stream provided in step (1) with a transition metal containing zeolitic material having a BEA-type framework structure for reacting one or more of the nitrogen oxides; wherein the zeolitic material is obtained from an organotemplate-free synthetic process.

In a second embodiment, the process of the first embodiment is modified, wherein the one or more nitrogen oxides comprise one or more compounds selected from the group consisting of $N_2O$, NO, $NO_2$, $N_2O_3$, $N_2O_4$, $N_2O_5$, $NO_3$, and mixtures of two or more thereof.

In a third embodiment, the process of the first and second embodiments is modified, wherein the gas stream provided in step (1) comprises $N_2O$ in an amount comprised in the range of from 10 to 10,000 ppmv.

In a fourth embodiment, the process of the first through third embodiment is modified, wherein the gas stream provided in step (1) comprises NOx in an amount comprised in the range of from 0 to 5,000 ppmv.

In a fifth embodiment, the process of the first through fourth embodiments is modified, wherein the gas stream provided in step (1) comprises $N_2O$ and NOx in a molar ratio of $NO_x:N_2O$ comprised in the range of from 1:50 to 5:1.

In a sixth embodiment, the process of the first through fifth embodiments is modified, wherein the gas stream provided in step (1) further comprises one or more reducing agents.

In a seventh embodiment, the process of the sixth embodiment is modified, wherein the one or more reducing agents comprises one or more compounds selected from the group consisting of hydrocarbons, carbon monoxide, hydrogen, and combinations of two or more thereof.

In an eighth embodiment, the process of the sixth and seventh embodiments is modified, wherein the stoichiometric ratio of the one or more reducing agents to the one or more nitrogen oxides is comprised in the range of from 0.05 to 50.

In a ninth embodiment, the process of the sixth through eighth embodiments is modified, wherein the reducing agent does not comprise ammonia and/or urea.

In a tenth embodiment, the process of the first through ninth embodiments is modified, wherein the gas stream provided in step (1) comprises from 0 to 10% by volume of oxygen.

In an eleventh embodiment, the process of the first through tenth embodiments is modified, wherein the gas stream provided in step (1) comprises from 0 to 10% by volume of $H_2O$.

In a twelfth embodiment, the process of the first through eleventh embodiments is modified, wherein the gas stream provided in step (1) comprises one or more waste gases.

In a thirteenth embodiment, the process of the first through twelfth embodiments is modified, wherein the gas stream provided in step (1) comprises one or more waste gases from an internal combustion engine.

In a fourteenth embodiment, the process of the twelfth or thirteenth embodiments is modified, wherein the one or more waste gases comprised in the gas stream provided in step (1) have not been subject to a catalytic treatment procedure for the abatement of $N_2O$ and/or $NO_x$ beforehand.

In a fifteenth embodiment, the process of the first through fourteenth embodiment is modified, wherein the contacting of the gas stream with the transition metal containing zeolitic material in step (2) is conducted at a temperature comprised in the range of from 250 to 550° C.

In a sixteenth embodiment, the process of the first through fifteenth embodiment is modified, wherein the contacting of the gas stream with the transition metal containing zeolitic material in step (2) is conducted at a pressure comprised in the range of from 1 to 50 bar.

In a seventeenth embodiment, the process of the first through sixteenth embodiment is modified, wherein the process is preferably a continuous process.

A second aspect of the present invention is directed to an apparatus for the treatment of a gas stream containing nitrogen oxides. In an eighteenth embodiment, an apparatus for the treatment of a gas stream containing nitrogen oxides, the apparatus comprises: (i) a catalyst bed provided in fluid contact with the gas stream to be treated; wherein the catalyst bed comprises a transition metal containing zeolitic material having a BEA-type framework structure, the zeolitic material obtained from an organotemplate-free synthetic process.

In a nineteenth embodiment, the apparatus of the eighteenth embodiment is modified, wherein the catalyst bed is a fixed bed catalyst or a fluidized bed catalyst.

In a twentieth embodiment, the eighteenth or nineteenth embodiments is modified, wherein the apparatus further comprises (ii) one or more devices provided upstream of the catalyst bed for injecting one or more reducing agents into the gas stream.

In a twenty-first embodiment, the apparatus of the eighteenth through twentieth embodiments is modified, wherein the one or more transition metals contained in the zeolitic material is selected from the group consisting of Co, Ni, Cu, Fe, Ag, Au, Pt, Pd, Rh and combinations of two or more thereof.

In a twenty-second embodiment, the apparatus of the eighteenth through twenty-first embodiments is modified, wherein the one or more transition metals are contained in the zeolitic material as non-framework elements.

In a twenty-third embodiment, the apparatus of the eighteenth through twenty-second embodiments is modified, wherein the BEA-type framework structure of the zeolitic material comprises $YO_2$ and $X_2O_3$, wherein Y is a tetravalent element, and X is a trivalent element.

In a twenty-fourth embodiment, the apparatus of the eighteenth through twenty-third embodiments is modified, wherein Y is selected from the group consisting of Si, Sn, Ti, Zr, Ge, and a mixture of two or more thereof.

In a twenty-fifth embodiment, the apparatus of the eighteenth through twenty-fourth embodiments is modified, wherein X is selected from the group consisting of Al, B, In, Ga, and a mixture of two or more thereof.

In a twenty-sixth embodiment, the apparatus of the eighteenth through twenty-fifth embodiment is modified, wherein the $YO_2:X_2O_3$ molar ratio ranges from 2 to 100.

In a twenty-seventh embodiment, the apparatus of the eighteenth through twenty-sixth embodiment is modified, wherein the molar ratio of the one or more transition metals to $X_2O_3$ comprised in the BEA-type framework structure ranges from 0.005 to 10.

In a twenty-eighth embodiment, the apparatus of the eighteenth through twenty-seventh embodiment is modified, wherein the X-ray diffraction pattern of the zeolitic material having a BEA-type framework structure comprises at least the following reflections:

| Intensity (%) | Diffraction angle 2θ/° [Cu K(alpha 1)] |
|---|---|
| [11-31] | [21.07-21.27] |
| 100 | [22.12-22.32] |
| [13-33] | [25.01-25.21] |
| [17-37] | [25.53-25.73] |
| [13-33] | [26.78-26.98] |
| [11-31] | [28.39-28.59] |
| [22-42] | [29.24-29.44] |
| [6-26] | [30.00-30.20] |
| [9-29] | [32.86-33.26] |
| [11-31] | [42.90-43.30] | wherein 100% relates to the intensity of the maximum peak in the X-ray powder diffraction pattern.

In a twenty-ninth embodiment, the apparatus of the eighteenth through twenty-eighth embodiments is modified, wherein the zeolitic material having a BEA-type framework structure comprises zeolite beta.

In a thirtieth embodiment, the apparatus of the eighteenth through twenty-ninth embodiments is modified, wherein the transition metal containing zeolitic material is comprised in a molding.

DETAILED DESCRIPTION

Figure 1:
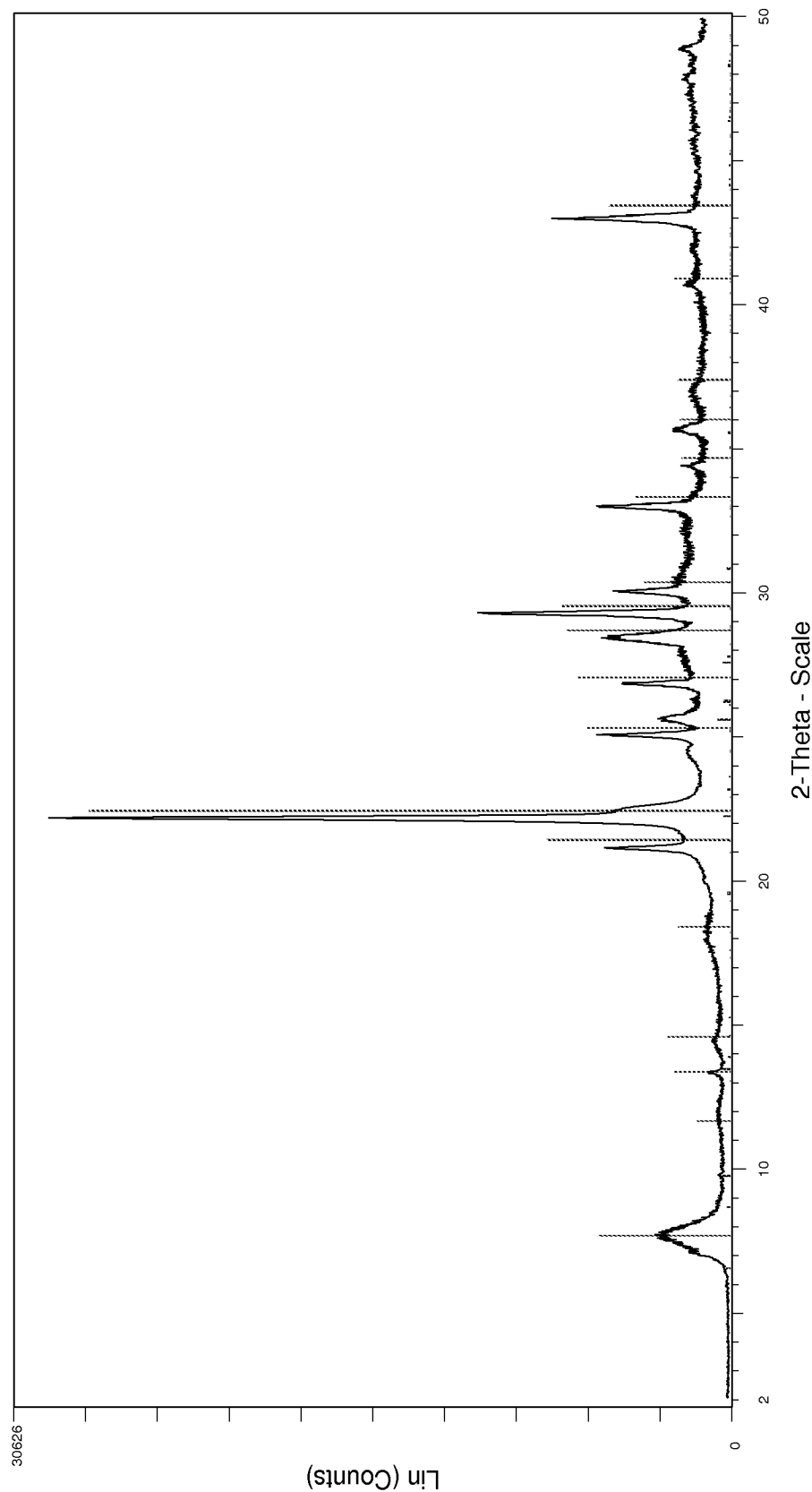
FIG. 1: X-ray diffraction pattern (measured using Cu K alpha-1 radiation) of the crystalline material obtained according to Example 1.

Provided is an improved process for the treatment of gas streams containing nitrogen oxides, and in particular those containing both $NO_x$ and $N_2O$. Thus, it has surprisingly been found that by using a transition metal containing zeolitic material which is specifically obtainable from an organotemplate-free synthetic process, a highly efficient process for the treatment of a gas stream containing nitrogen oxides may be provided. In particular, it has quite unexpectedly been found that the use of such specific zeolitic materials not only allows for the improved treatment of nitrogen oxides and in particular of $N_2O$ and $NO_x$ compared to conventional zeolitic materials. Far more, it has quite surprisingly been found that the simultaneous treatment of several different nitrogen oxides contained in exhaust gas streams and in particular of $N_2O$ and $NO_x$ is possible in a single process step. Furthermore, it has unexpectedly been found that said single stage treatment of nitrogen oxides may also be achieved in a highly efficient manner using reducing agents other than those containing nitrogen known and used in the art, and in particular using hydrocarbons.

Therefore, the present invention relates to a process for the treatment of a gas stream containing nitrogen oxides comprising the steps of:
(1) providing a gas stream containing one or more nitrogen oxides;
(2) contacting the gas stream provided in step (1) with a transition metal containing zeolitic material having a BEA-type framework structure for reacting one or more of the nitrogen oxides;
wherein the zeolitic material is obtainable from an organotemplate-free synthetic process.

According to the present invention, there is no particular restriction with respect to the nitrogen oxides which may be treated in the inventive process. Furthermore, it is noted that the term "treatment" as employed in the present application refers to any suitable chemical conversion of one or more of the nitrogen oxides to one or more nitrogen and/or oxygen containing compounds, wherein, in one or more embodiments, one or more of the chemical conversions is catalyzed by the transition metal containing zeolitic material having a BEA-type framework structure as provided in step (2). Regarding the one or more nitrogen and/or oxygen containing compounds to which one or more of the nitrogen oxides contained in the gas stream to be treated in the inventive process are converted, there is no particular restriction according to the present invention as to the number or types of compounds which result from the aforementioned chemical conversion. According to one or more embodiments of the present invention, the one or more nitrogen and/or oxygen containing compounds to which one or more of the nitrogen oxides are converted substantially do not comprise any nitrogen oxides, wherein the term "nitrogen oxides" as employed in the present application generally refers to any binary compound comprising nitrogen and oxygen, wherein more preferably the term "nitrogen oxide" designates $N_2O$, NO, $NO_2$, $N_2O_3$, $N_2O_4$, $N_2O_5$, $NO_3$, as well as mixtures of two or more thereof, wherein within a particularly preferred meaning the term "nitrogen oxides" specifically designates $N_2O$, NO, $NO_2$, and mixtures of two or more thereof, wherein even more preferably the term "nitrogen oxides" designates $N_2O$ and/or $NO_x$. In this respect, it is further noted that the term "$NO_x$" as employed in the present application designates NO and/or $NO_2$, and in particular mixtures of NO and $NO_2$.

According to particular embodiments of the inventive process wherein the one or more nitrogen oxides contained in the gas stream to be treated include both $N_2O$ and $NO_x$, it is preferred that the treatment thereof in step (2) of the inventive process includes the abatement of $N_2O$ wherein NO being available from the equilibrium reaction

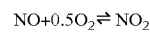
$$NO + 0.5 O_2 \rightleftharpoons NO_2$$

and which is therefore present in the gas stream serves as a co-catalyst for the conversion of $N_2O$ to nitrogen dioxide and oxygen according the reaction

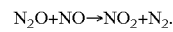
$$N_2O + NO \rightarrow NO_2 + N_2.$$

Furthermore, according to embodiments of the inventive process wherein one or more reducing agents are present in the gas stream during the contacting of said gas stream with a transition metal containing zeolitic material having a BEA-type framework structure in step (2), it is preferred that the term "treatment" includes at least one catalytic reduction process wherein one or more of the nitrogen oxides is catalytically reduced by reaction with one or more of the reducing agents for conversion to one or more nitrogen and/or oxygen containing compounds. In particular, according to specific embodiments of the inventive process wherein $N_2O$ and/or $NO_x$ is contained in the gas stream to be treated, the term "treatment" includes the selective catalytic reduction of $N_2O$ and/or $NO_x$, and in particular includes the selective catalytic reduction of both $N_2O$ and $NO_x$ by catalytic conversion with one or more reducing agents present in the gas stream.

Therefore, according to the inventive process, it is preferred that the one or more nitrogen oxides contained in the gas stream to be treated comprise one or more compounds selected from the group consisting of $N_2O$, NO, $NO_2$, $N_2O_3$, $N_2O_4$, $N_2O_5$, $NO_3$, and mixtures of two or more thereof, preferably one or more compounds selected from the group consisting of $N_2O$, NO, $NO_2$, and mixtures of two or more thereof, wherein even more preferably the one or more nitrogen oxides contained in the gas stream provided in step (1) comprise $N_2O$ and/or $NO_x$.

Besides there being no general restriction according to the present invention as to the number and/or types of nitrogen oxides present in the gas stream to be treated in the inventive process, same applies in principle with respect to the amount of the one or more nitrogen oxides contained in the gas stream to be treated. Thus, in principle, any conceivable amount of nitrogen oxides may be present in the gas stream provided in step (1) of the inventive process, provided that one or more of the nitrogen oxides may be treated in step (2) by contacting of the gas stream with a transition metal containing zeolitic material having a BEA-type framework structure according to any of the particular or preferred embodiments of the inventive process as defined in the present application.

According to the present invention, it is however preferred that only minor amounts of one or more nitrogen oxides are contained in the gas stream to be treated. Thus, by way of example, the amount of the one or more nitrogen oxides is preferably comprised in the range of from 10 to 15,000 ppmv, wherein more preferably the gas stream comprises one or more nitrogen oxides in an amount ranging from 50 to 7,000 ppmv, more preferably from 100 to 4,000 ppmv, more preferably from 150 to 3,000 ppmv, and even more preferably from 200 to 2,000 ppmv. According to particularly preferred embodiments of the present invention, the amount of the one or more nitrogen oxides contained in the gas stream provided in step (1) is comprised in the range of from 250 to 1,500 ppmv.

In particular embodiments of the inventive process wherein the gas stream provided in step (1) contains $N_2O$, it is preferred according to the present invention that its content is comprised in the range of from 10 to 10,000 ppmv, and more preferably in the range of from 50 to 5,000 ppmv, more preferably from 100 to 3,000 ppmv, more preferably from 500 to 2,000 ppmv, more preferably from 700 to 1,500 ppmv, and even more preferably from 900 to 1,100 ppmv. According to alternative and/or further preferred embodiments of the inventive process wherein the gas stream provided in step (1) comprises $NO_x$, it is preferred that it $NO_x$ contained in the gas stream in an amount ranging from 10 to 5,000 ppmv, more preferably from 50 to 2,000 ppmv, more preferably from 100 to 1,000 ppmv, more preferably from 150 to 800 ppmv, more preferably from 200 to 600 ppmv, and even more preferably from 250 to 500 ppmv.

According to particularly preferred embodiments of the present invention in which the gas stream provided in step (1) comprises both $N_2O$ and $NO_x$, on the other hand, it is further preferred that said nitrogen oxides are comprised in the gas stream to be treated in step (2) in an amount ranging from 20 to 15,000 ppmv, more preferably from 100 to 7,000 ppmv, more preferably from 200 to 4,000 ppmv, more preferably from 650 to 2,800 ppmv, more preferably from 900 to 2,100 ppmv, and even more preferably from 1,150 to 1,600 ppmv.

As regards embodiments of the inventive process wherein the gas stream to be treated in step (2) contains two or more nitrogen oxides, there is no particular restriction according to the present invention as to the respective amounts of the two or more nitrogen oxides and therefore also with respect to the molar ratios of the two or more nitrogen oxides comprised in the gas stream. Thus, according to said particular embodiments wherein the gas stream contains two or more nitrogen oxides, any conceivable molar ratio of the two or more nitrogen oxides may be employed provided that the treatment of one or more of said nitrogen oxides may be realized in step (2) of the inventive process via chemical conversion thereof upon contacting of the gas stream with a transition metal containing zeolitic material having a BEA-type framework structure. Thus, by way of example, according to particularly preferred embodiments of the inventive process wherein the gas stream provided in step (1) comprises both $N_2O$ and $NO_x$, there is no particular restriction as to the molar ratio of $NO_x:N_2O$ contained in the gas mixture. Accordingly, the $NO_x:N_2O$ molar ratio displayed by the gas stream employed in said particularly preferred embodiments may range anywhere from 1:1000 to 1:1, wherein preferably the $NO_x:N_2O$ molar ratio is comprised in the range of from 1:50 to 5:1, more preferably of from 1:20 to 2:1, more preferably of from 1:10 to 1:1, more preferably of from 1:5 to 1:1.5, and even more preferably of from 1:4 to 1:2.

In the inventive process, one or more further gases may be contained in the gas stream provided in step (1) of the inventive process. In this respect, no particular restriction applies neither with respect to the type of the one or more gases which may be contained in the gas stream, nor with respect to their respective amounts, provided that one or more of the nitrogen oxides further contained in the gas stream may be treated by contacting the gas stream with a transition metal containing zeolitic material having a BEA-type framework structure in step (2) of the inventive process. Thus, by way of example, the one or more further gases which may be contained in the gas stream to be treated may include any one of $N_2$, $O_2$, $CO_2$, (gaseous) $H_2O$, and mixtures of two or more thereof in addition to the one or more nitrogen oxides, wherein preferably the gas stream further comprises one or more gases selected from the group consisting of $N_2$, $O_2$, (gaseous) $H_2O$, and mixtures of two or more thereof, wherein even more preferably the gas stream to be treated containing one or more nitrogen oxides further comprises $N_2$, and/or $O_2$, and even more preferably both $N_2$ and $O_2$.

According to preferred embodiments of the present invention, the gas stream provided in step (1) further comprises one or more reducing agents. In principle, there is no particular restriction as to the one or more reducing agents which may be employed in the inventive process, provided that one or more of the one or more nitrogen oxides contained in the gas stream provided in step (1) may be treated in step (2) by contacting the gas stream with a transition metal containing zeolitic material having a BEA-type framework structure. It is, however, preferred that according to said particular embodiments of the inventive process, that one or more of the reducing agents are chosen such that they may react with one or more of the nitrogen oxides contained in the gas stream provided in step (1), preferably via catalytic action of the transition metal containing zeolitic material which is contacted in step (2) with the gas stream, such as to convert the one or more nitrogen oxides to one or more nitrogen and/or oxygen containing compounds other than nitrogen oxides as particularly and preferably defined in the present application.

In general, any suitable reducing agent may be used to this effect, such as for example one or more reducing agents selected from the group consisting of ammonia, urea, hydrocarbons, carbon monoxide, hydrogen, and combinations of two or more thereof. According to the preferred embodiments of the inventive process wherein the gas stream comprises one or more reducing agents, it is however preferred that said reducing agents comprise one or more compounds selected from the group consisting of hydrocarbons, carbon monoxide, hydrogen, and combinations of two or more thereof, wherein the one or more reducing agents preferably comprise one or more hydrocarbons, more preferably one or more hydrocarbons selected from the group consisting of $C_1$ to $C_6$ alkanes, preferably $C_1$ to $C_5$ alkanes, wherein more preferably the one or more reducing agents comprises one or more hydrocarbons selected from the group consisting of methane, ethane, propane, and butane, wherein even more preferably the one or more reducing agents comprise methane and/or propane and/or butane, more preferably methane and/or propane, and wherein even more preferably the one or more reducing agents comprise propane.

According to said particular and preferred embodiments of the inventive process employing one or more reducing agents in the gas stream provided in step (1), it is yet further preferred that the one or more reducing agents do not comprise ammonia or urea or a mixture of ammonia and urea. Thus, in view of the surprising technical advantages of the present invention mentioned in the foregoing relative to the use of reducing agents which until now could not be practically employed for the treatment of gas streams containing nitrogen oxides, it is particularly preferred that said reducing agents be employed at least in addition to and even more preferably instead of the reducing agents typically used in the treatment of gas streams containing nitrogen oxides. As regards the reducing agents typically used in the art for the treatment of nitrogen oxides, and in particular for their selective catalytic reduction, the use of nitrogen containing compounds may be mentioned, and more specifically of nitrogen containing compounds wherein nitrogen is present therein in a negative oxidation state. In this respect, the most notable examples of nitrogen containing compounds typically used in selective catalytic reduction, the use of ammonia, urea, including any derivatives of ammonia and/or urea, may be mentioned, and in particular the use of ammonia and/or urea. Consequently, according to the present invention, it is particularly preferred that the reducing agents which may be contained in the gas stream provided in step (1) of the inventive process do not comprise one or more and even more preferably does not comprise any one of the aforementioned nitrogen containing compounds.

Therefore, according to particularly preferred embodiments of the present invention, the one or more reducing agents preferably employed in the inventive process do not comprise ammonia and/or urea, wherein preferably the reducing agent does not comprise ammonia, urea, or any derivatives of ammonia or urea, wherein more preferably the reducing agent does not comprise a nitrogen containing compound wherein nitrogen is present in a negative oxidation state, and wherein even more preferably the reducing agent does not comprise a nitrogen containing compound.

Concerning the one or more reducing agents comprised in the gas stream provided in step (1) of the inventive process, there is no particular restriction according to the present invention as to the way in which said one or more reducing agents are provided together with the one or more nitrogen oxides and any further gases or compounds which may further be present in the gas stream provided in step (1). Thus, in principle, the one or more reducing agents preferably used in the inventive process may initially be present in the gas stream used in the inventive process depending on the source or sources from which said gas stream is obtained. Alternatively, or in addition thereto, the one or more reducing agents according to any of the particular and preferred embodiments of the present invention may be added to an existing gas stream such as to provide a gas stream comprising one or more reducing agents in step (1) of the inventive process. According to further embodiments of the inventive process which are particularly preferred, the one or more reducing agents preferably contained in the gas stream provided in step (1) is at least further provided in addition to the initial components of a gas stream comprising one or more nitrogen oxides wherein even more preferably the one or more reducing agents according to particular and preferred embodiments of the present invention is first added to a gas stream comprising one or more nitrogen oxides for providing a gas stream comprising one or more nitrogen oxides in addition to one or more reducing agents in step (1) of the inventive process.

As concerns the amount of the one or more reducing agents comprised in the gas stream provided in step (1) according to particular and preferred embodiments of the present invention, there is no particular restriction as to the particular amount in which said one or more reducing agents is contained in/or added to the gas stream provided in step (1). Thus, by way of example, the molar ratio of the one or more reducing agents to the one or more nitrogen oxides in the gas stream provided in step (1) is comprised in the range of anywhere from 0.01 to 5, preferably of from 0.1 to 3.5, more preferably of from 0.15 to 2.5, more preferably of from 0.25 to 2, more preferably of from 0.35 to 1.75, more preferably of from 0.4 to 1.5, and even more preferably of from 0.45 to 1.25. According to particularly preferred embodiments, the molar ratio of the one or more reducing agents to the one or more nitrogen oxides in the gas stream provided in step (1) of the inventive process ranges from 0.5 to 1. As regards said particular and preferred ranges for the molar ratio of the one or more reducing agent to the one or more nitrogen oxides, it is particularly preferred that the aforementioned particular and preferred ranges refer to the molar ratio of the one or more hydrocarbons preferably used as the one or more reducing agents to $N_2O$ and/or $NO_x$ preferably comprised among the one or more nitrogen oxides.

According to further preferred embodiments of the inventive process, the ratio of the amount of the one or more reducing agents to the one or more nitrogen oxides is provided as a specific stoichiometric ratio. More specifically, the amount of the one or more reducing agents to the one or more nitrogen oxides is provided in terms of the quantity of the one or more reducing agents ideally required for complete conversion of the one or more reducing agents with the one or more nitrogen oxides in the treatment of a gas stream as provided in step (1) of the inventive process. Thus, in general, complete conversion of the one or more reducing agents within the meaning of the present invention refers to their complete transformation from the initially reduced state in which they are used to the level of oxidation of said compounds ideally achieved upon reaction with one or more nitrogen oxides contained in the gas stream to be treated, wherein preferably the level of oxidation of the one or more reducing agents which is achieved refers to the maximum oxidation of the one or more reducing agents which may be achieved in the inventive treatment process upon contacting the gas stream provided in step (1) with a transition metal containing zeolitic material having a BEA-type framework structure in step (2) of the inventive process.

Thus, as concerns the specific use of ammonia and/or urea and/or derivatives of either of said compounds, the ideal stoichiometric transformation of said reducing agents with the one or more nitrogen oxides corresponding to a stoichiometric ratio of 1 corresponds to the molar ratio of the one or more reducing agents to the one or more nitrogen oxides according to which complete conversion of the reactants in the catalyzed environment provided in step (2) of the inventive process would lead to the complete conversion of the nitrogen oxides to $N_2$, $O_2$, and $H_2O$, wherein in the event that urea and/or derivatives of urea and/or ammonia is employed, further compounds such as $CO_2$ may equally be formed. According to preferred embodiments wherein the one or more reducing agents comprise one or more hydrocarbons, a stoichiometric ratio of 1 accordingly corresponds to the molar ratio of the one or more hydrocarbons to the one or more nitrogen oxides wherein under the conditions of selective catalytic reduction provided in step (2) of the inventive process complete conversion of the reactants to $N_2$, $CO_2$, $H_2O$ and eventually $O_2$ may theoretically be achieved. Same applies accordingly with respect to the use of other reducing agents and in particular with respect to particular and preferred reducing agents which may be employed in the inventive process such as carbon monoxide and/or hydrogen, stoichiometric conversion thereof with the one or more nitrogen oxides under the selective catalytic reduction conditions provided in step (2) of the inventive process leading to their complete conversion together with the one or more nitrogen oxides to $CO_2$, $N_2$, and eventually $O_2$ in the case of carbon monoxide and/or to $N_2$, $H_2O$ and eventually $O_2$ when employing hydrogen as a reducing agent.

Therefore, according to alternatively preferred embodiments of the inventive process, the stoichiometric ratio of the one or more reducing agents to the one or more nitrogen oxides contained in the gas stream provided in step (1) of the inventive process may be provided, or any stoichiometric ratio either exceeding 1 (super-stoichiometric) or below 1 (sub-stoichiometric) may be employed provided that one or more of the nitrogen oxides contained in the gas stream may be treated at least in part in step (2) of the inventive process. Thus, by way of example, the stoichiometric ratio of the one or more reducing agents to the one or more nitrogen oxides may be comprised in the range of anywhere from 0.05 to 50, wherein preferably the stoichiometric ratio ranges from 0.1 to 20, preferably from 0.15 to 10, more preferably of from 0.25 to 5, more preferably of from 0.35 to 2, more preferably of from 0.5 to 1.5, more preferably of from 0.65 to 1.25, and even more preferably of from 0.75 to 1.1. Furthermore, it is particularly preferred according to the present invention that the aforementioned particular and preferred stoichiometric ratios of the one or more reducing agents to the one or more nitrogen oxides refers to the stoichiometric ratio of one or more hydrocarbons to $N_2O$ and/or $NO_x$ preferably contained in the gas stream provided in step (1) and treated in step (2) of the inventive process.

Regarding the components which may further be present in the gas stream containing one or more nitrogen oxides, it has been noted that according to the present invention oxygen may additionally be contained in the gas stream. In this respect, according to embodiments wherein oxygen is further contained in the gas stream provided in step (1), there is no particular restriction as to the amount in which it may be contained therein provided that one or more of the nitrogen oxides may be treated in step (2). According to alternative embodiments of the present invention, however, the gas stream provided in step (1) comprises substantially no oxygen.

Within the meaning of the present invention, the term "substantial" as for example employed in the terms "substantially not" or "not any substantial amount of" respectively referring to their practically being not any amount of the component referred to in the gas mixture provided in step (1) and/or treated in step (2) of the inventive process, generally designates an amount thereof being 0.1 percent by volume or less based on 100% by volume of the gas stream as provided in step (1) and/or treated in step (2), preferably an amount of 0.05 percent by volume or less, more preferably of 0.001 percent by volume or less, more preferably or 0.0005 percent by volume or less, and even more preferably of 0.0001 percent by volume or less.

Regarding those embodiments of the present invention wherein oxygen is contained in the gas stream provided in step (1), it is nevertheless preferred that oxygen is contained as a minor component in terms of the percent by volume content thereof based on 100% by volume of the gas stream provided in step (1). Thus, by way of example, the gas stream provided in step (1) may comprise anywhere from 0 to 10% by volume of oxygen, wherein said gas stream preferably comprises from 0.5 to 8% by volume of oxygen, more preferably from 1 to 6% by volume, more preferably from 1.5 to 5% by volume, more preferably from 2 to 4% by volume, and even more preferably from 2.5 to 3.5% by volume of oxygen.

Furthermore, as noted above, the gas stream provided in step (1) may comprise $H_2O$ as a further component in addition to the one or more nitrogen oxides. According to alternative embodiments of the present invention, however, a gas stream may be provided in step (1) which does not contain any substantial amount of $H_2O$. In general, with respect to those embodiments of the present invention wherein the gas stream provided in step (1) comprises $H_2O$, there is again no particular restriction as to the amount of $H_2O$ which may be contained therein provided that the treatment of one or more of the nitrogen oxides contained in the gas stream may be realized in step (2) of the inventive process. Nevertheless, it is preferred according to the present invention that the gas stream provided in step (1), if containing any substantial amount of $H_2O$, only contains $H_2O$ as a minor component of the gas stream in terms of percent by volume based on 100% by volume of the gas stream. Thus, by way of example, the gas stream provided in step (1) may comprise anywhere from 0 to 10% by volume of $H_2O$, wherein it is preferred that the gas stream comprises from 0.05 to 5% by volume of $H_2O$, more preferably from 0.1 to 3% by volume, more preferably from 0.1 to 2% by volume, more preferably from 0.15 to 1% by volume, and even more preferably from 0.2 to 0.5% by volume of $H_2O$.

With respect to the origin of the gas stream provided in step (1) for treatment of one or more of the nitrogen oxides contained therein, there is no particular restriction according to the present invention as to the source or sources from which it is obtained. It is, however, preferred according to the present invention that the gas stream provided in step (1) comprises one or more waste gases. Within the meaning of the present invention, the term "waste gas" refers to any gas stream resulting from a chemical conversion of which one or more of the nitrogen oxides contained therein and preferably all of the nitrogen oxides contained therein is not used or not destined for use in a further chemical reaction or process. More specifically, the term "waste gas" as employed in the present application preferably designates waste gas from an industrial process and/or from a combustion process such as from a power plant and/or from an internal combustion engine.

Thus, according to a particular embodiment of the present invention, the one or more waste gases preferably comprised in the gas stream provided in step (1) is a waste gas stream from one or more industrial processes, wherein more preferably the waste gas stream comprises one or more waste gas streams obtained in processes for producing adipic acid, nitric acid, hydroxylamine derivatives, caprolactame, glyoxal, methyl-glyoxal, glyoxylic acid or in processes for burning nitrogenous materials, including mixtures of waste gas streams from two or more of said processes, wherein even more preferably the waste gas stream comprises one or more waste gas streams obtained in processes for producing adipic acid and/or nitric acid. Alternatively, one or more of the waste gases preferably contained in the gas stream provided in step (1) of the inventive process results from a combustion process and preferably from a combustion process taking place in an internal combustion engine. In this respect, the internal combustion engine may be a stationary source of energy such as a power plant containing a gas turbine or the like, or may be contained in a motor vehicle such as in a motor cycle, an automobile, a bus, or a truck. According to particularly preferred embodiments of the present invention, the one or more waste gases are from the internal combustion engine of an automotive vehicle engine or of a power plant, and preferably from a gas turbine of a power plant.

As regards the particular and preferred combustion engine which may be the source of the one or more waste gases contained in the gas stream provided in step (1) of the inventive process, there is no particular restriction as to the combustive material used therein provided that the combustion in said internal combustion engine leads to a waste gas comprising one or more nitrogen oxides. Thus, by way of example, the internal combustion engine may operate using one or more hydrocarbons as the fuel. In this respect, there is no particular restriction as to the number or types of hydrocarbons on which the internal combustion engine runs for providing a gas stream comprising one or more nitrogen oxides. Accordingly, the internal combustion engine may for example use a fuel comprising any $C_1$ to $C_{10}$ hydrocarbons or mixtures of two or more thereof, wherein preferably the internal combustion engine uses a gas comprising $C_1$ to $C_8$ hydrocarbons or mixtures of two or more thereof, more preferably $C_1$ to $C_6$ hydrocarbons or mixtures of two or more thereof, more preferably $C_1$ to $C_5$ hydrocarbons or mixtures of two or more thereof, more preferably using a gas comprising methane and/or propane, and even more preferably using a gas comprising methane.

Regarding the one or more waste gases preferably comprised in the gas stream provided in step (1) of the inventive process, said one or more waste gases may be directly used in the inventive process or, alternatively, may be provided in step (1) after having been subject to one or more previous treatment procedures and in preferably to one or more treatment procedures other than the treatment of nitrogen oxides according to the inventive process. According to the present invention, however, it is particularly preferred that the one or more waste gases comprised in the gas stream provided in step (1) have not been subject to any treatment procedure prior to being directed to the inventive process, and in particular have not been subject to a catalytic treatment procedure for the abatement of $N_2O$ and/or $NO_x$ wherein even more preferably the one or more waste gases have not been subject to a catalytic treatment procedure for the abatement of nitrogen oxides as defined according to the particular and preferred meanings of the present invention. Thus, the one or more waste gases preferably contained in the gas stream provided in step (1) have preferably not been subject to a treatment procedure for the abatement of $N_2O$ and/or $NO_x$ beforehand, wherein even more preferably said waste gases have not been subject to a treatment procedure for the abatement of $N_2O$ and/or $NO_x$ and even more preferably of any one of the one or more nitrogen oxides before being used in the inventive process.

Therefore, according to preferred embodiments of the inventive process wherein the gas stream provided in step (1) comprises one or more waste gases, it is further preferred that the one or more waste gases have not been subject to a catalytic treatment procedure for the abatement of $N_2O$ and/or $NO_x$ beforehand, wherein preferably the one or more waste gases have not been subject to a catalytic treatment procedure for the abatement of one or more of the nitrogen oxides beforehand, wherein more preferably the one or more waste gases have not been subject to a treatment procedure for the abatement of $N_2O$ and/or $NO_x$ beforehand, and wherein even more preferably the one or more waste gases have not been subject to a treatment procedure for the abatement of one or more of the nitrogen oxides beforehand.

According to the process of the present invention, there is no particular restriction as to the temperature at which the contacting of the gas stream with the transition metal containing zeolitic material is conducted in step (2), provided that one or more of the nitrogen oxides contained in the gas stream may be treated in said step. It is, however, preferred according to the present invention that said contacting is conducted at a temperature greater than room temperature and in particular at a temperature equal to or exceeding 150° C. Thus, according to particularly preferred embodiments of the inventive process, the contacting of the gas stream with the transition metal containing zeolitic material in step (2) is conducted at a temperature comprised in the range of from 250 to 550° C., preferably of from 300 to 500° C., more preferably of from 325 to 450° C., more preferably of from 350 to 425° C., and even more preferably of from 380 to 420° C. According to particularly preferred embodiments of the present invention, the temperature at which the contacting of the gas stream with the zeolitic material is performed in step (2) is comprised in the range of from 390 to 410° C.

Regarding the further reaction parameters of the inventive process, and in particular concerning the pressure at which the contacting of the gas stream with the transition metal containing zeolitic material in step (2) is conducted, same applies accordingly as with respect to the temperature employed in said step. Thus, any suitable pressure may be employed provided that one or more of the nitrogen oxides may be treated. According to the present invention, it is however preferred that the contacting in step (2) is performed at a pressure higher than the atmospheric pressure and in particular at a pressure comprised in the range of from 0 to 50 bar, preferably of from 1 to 30 bar, more preferably from 2 to 25 bar, more preferably of from 3 to 20 bar, more preferably of from 4 to 15 bar, more preferably of from 5 to 10 bar, and even more preferably of from 6 to 8 bar. According to the present invention it is however particularly preferred that the contacting of the gas stream with the zeolitic material in step (2) is performed at a pressure comprised in the range of from 6.5 to 7.5 bar.

According to particularly preferred embodiments of the present invention, it is further preferred that the contacting of the gas stream with the transition metal containing zeolitic material in step (2) is conducted at a temperature comprised in the range of from 250 to 550° C. and at a pressure comprised in the range of from 0 to 50 bar, wherein more preferably the temperature in step (2) is comprised in the range of from 300 to 500° C. and the pressure in the range of from 1 to 30 bar, more preferably wherein the temperature is in the range of from 325 to 450° C. and the pressure in the range of from 3 to 20 bar, more preferably wherein the temperature is in the range of from 350 to 425° C. and the pressure is in the range of from 4 to 15 bar, more preferably wherein the temperature is in the range of from 380 to 420° C. and the pressure in the range of from 5 to 10 bar. According to further preferred embodiments which are particularly preferred, the contacting of the gas stream with the transition metal containing zeolitic material in step (2) is conducted at a temperature comprised in the range of from 390 to 410° C. and at a pressure comprised in the range of from 6 to 8 bar.

As employed in the present invention, the values of pressure defined in the present application refer to a pressure in addition to normal pressure, and the values reflect the pressure in excess thereof. Thus, a pressure of 1 bar as defined in the present application designates a pressure of 1 bar in addition to the normal pressure, such that given a normal pressure of 1 bar, the pressure defined as 1 bar would correspond to an absolute pressure of 2 bara. In this respect, the term "normal pressure" as used in the context of the present invention relates to a pressure of 101,325 Pa in the ideal case. However, this pressure may vary within boundaries known to the person skilled in the art. By way of example, this pressure can be in the range of from 95,000 to 106,000 or of from 96,000 to 105,000 or of from 97,000 to 104,000 or of from 98,000 to 103,000 or of from 99,000 to 102,000 Pa.

As noted in the foregoing, there is no particular restriction as to the way in which the gas stream containing nitrogen oxides is contacted with the transition metal containing zeolitic material in step (2) of the inventive process. Thus, said step of contacting may principally be achieved in a static mode such as in a batch process or the like, or in a continuous mode, wherein according to the present invention the inventive process is preferably a continuous process for the treatment of a gas stream containing nitrogen oxides. Thus, according to said preferred embodiments, the gas stream containing nitrogen oxides is continuously contacted with a transition metal containing zeolitic material at a given gas hourly space velocity expressed in $h^{-1}$, which, according to the present invention, is preferably defined as the norm liters of the gas ($NL_{gas}$) per liter of the catalyst ($L_{cat}$) per hour which may be expressed by the unit of measure "$NL_{gas}/(L_{cat} \times h)$".

In principle, the gas hourly space velocity (GHSV) which may be employed in preferred embodiments of the inventive process conducted in a continuous mode is not particularly restricted provided that depending on the given composition of the gas stream containing nitrogen oxides as well as the reaction parameters employed, one or more of the nitrogen oxides may be treated in step (2). Thus, by way of example, the gas hourly space velocity may be comprised in the range of anywhere of from 1,000 to 100,000 $h^{-1}$, wherein more preferably the GHSV is comprised in the range of from 2,500 to 50,000 $h^{-1}$, more preferably of from 5,000 to 30,000 $h^{-1}$, more preferably of from 10,000 to 25,000 $h^{-1}$, and even more preferably of from 15,000 to 22,500 $h^{-1}$, wherein—as noted in the foregoing—the measurement unit $h^{-1}$ preferably designates the specific unit of measure "$NL_{gas}/(L_{cat} \times h)$".

According to the present invention, the gas stream provided in step (1) is contacted in step (2) with a transition metal containing zeolitic material having a BEA-type framework structure, wherein the zeolitic material is obtainable from an organotemplate-free synthetic process. As regards the zeolitic material having a BEA-type framework structure, there is no particular restriction, neither with respect to the number, nor with respect to the types of zeolitic materials which may be used provided that the framework structure thereof may be attributed to the BEA framework type, in particular with respect to its X-ray diffraction pattern. Thus, by way of example, the zeolitic material may comprise one or more zeolitic materials selected from the group consisting of zeolite beta, [B—Si—O]-BEA, [Ga—Si—O]-BEA, [Ti—Si—O]-BEA, Al-rich beta, CIT-6, tschernichite, pure silica beta, and mixtures of two or more thereof, wherein it is preferred according to the present invention that the zeolitic material comprises zeolite beta.

According to the present invention, the zeolitic material employed in step (2) of the inventive process is further characterized by the fact that it is a zeolitic material which is obtainable from an organotemplate-free synthetic process. Within the meaning of the present invention, the term "obtainable" designates any material which may directly be obtained from a specific process as well as any material which, although not directly obtained from a specific process, is principally obtainable, i.e. may be obtained using said specific process. Thus, according to the present invention, any zeolitic material having a BEA-type framework structure may in principle be used provided that it is either directly obtained or that it may be obtained from an organotemplate-free synthetic process regardless of the fashion in which it has actually been obtained, and that it is capable of converting one or more of the nitrogen oxides in step (2) of the inventive process for treatment of the gas stream provided in step (1).

Within the meaning of the present invention, the term "organotemplate" designates any conceivable organic compound which may act as the structure directing agent in the preparation of a zeolitic material having a BEA-type framework structure, and in particular of zeolite beta. According to a preferred definition of the present application, the term "organotemplate" designates specific tetraalkylammonium salts and/or related organotemplates which may be used in the synthesis of zeolitic materials having a BEA-type framework structure and in particular of zeolite beta such as tetraethylammonium and/or dibenzylmethylammonium salts and/or dibenzyl-1,4-diazabicyclo[2,2,2]octane. Thus, according to the inventive process, at no point does the organotemplate-free synthetic process from which the zeolitic material having a BEA-type framework structure employed in step (2) is obtainable involve more than an impurity of an organic structure directing agent specifically used in the synthesis of zeolitic materials having a BEA-type framework structure, in particular specific tetraalkylammonium salts and/or related organotemplates such as tetraethylammonium and/or dibenzylmethylammonium salts, and dibenzyl-1,4-diazabicyclo[2,2,2]octane. Such an impurity can, for example, be caused by organic structure directing agents still present in seed crystals used in the organotemplate-free synthetic process from which the zeolitic material having a BEA-type framework structure is obtainable. Organotemplates contained in seed crystal material may not, however, participate in the crystallization process since they are trapped within the seed crystal framework and therefore may not act as structure directing agents within the meaning of the present invention.

In preferred embodiments of the present invention, zeolitic materials having a BEA-type framework structure are preferred in which the BEA-type framework structure comprises $YO_2$ and $X_2O_3$, wherein Y is a tetravalent element, and X is a trivalent element. According to said preferred embodiments, Y may stand for any conceivable tetravalent element, Y standing for either one or several tetravalent elements. Preferred tetravalent elements according to the present invention include Si, Sn, Ti, Zr, and Ge, and combinations thereof. More preferably, Y stands for Si, Ti, or Zr, or any combination of said trivalent elements, even more preferably for Si and/or Sn. According to the present invention, it is particularly preferred that Y stands for Si.

Furthermore, as regards $X_2O_3$ preferably comprised in the framework of the zeolitic material having a BEA structure, X may again stand for any conceivable trivalent element, X standing for either one or several trivalent elements. Preferred trivalent elements according to the present invention include Al, B, In, and Ga, and combinations thereof. More preferably, Y stands for Al, B, or In, or any combination of said trivalent elements, even more preferably for Al and/or B. According to the present invention, it is particularly preferred that X stands for Al.

According to the present invention, there is no particular restriction as to the $YO_2:X_2O_3$ molar ratio displayed by the zeolitic material having a BEA-type framework structure as employed in the inventive process. Thus, in principle, the inventive zeolitic material may have any conceivable $YO_2:X_2O_3$ molar ratio. Accordingly, by way of example, the zeolitic material having a BEA-type framework structure may have an $YO_2:X_2O_3$ molar ratio comprised in the range of anywhere from 2 to 100, wherein preferably, the YO$_2$:X$_2$O$_3$ molar ratio is comprised in the range of from 4 to 70, more preferably from 5 to 50, more preferably from 6 to 30, more preferably from 7 to 20, more preferably from 8 to 15, and even more preferably from 9 to 13. According to particularly preferred embodiments, the inventive zeolitic material having a BEA-type framework structure has a YO$_2$:X$_2$O$_3$ molar ratio comprised in the range of from 10 to 11.

According to the present invention, the zeolitic material having a BEA-type framework structure employed in step (2) of the inventive process contains one or more transition metals. Within the meaning of the present invention, the term "transition metal" principally designates one or more of the metals contained in any one of groups 3 to 12 of the periodic table, and in particular those of periods 4 to 6, preferably in periods 4 and/or 5. More preferably, the term "transition metals" as employed in the present application designates one or more metals contained in groups 4 to 11 of the periodic table, and in particular those of periods 4 to 6, preferably in periods 4 and/or 5, wherein even more preferably said term designates one or more metals contained in groups 5 to 11 of the periodic table and in particular in periods 4 to 6, preferably in periods 4 and/or 5, wherein even more preferably the term designates one or more metals contained in groups 6 to 11, in particular in periods 4 to 6, preferably in periods 4 and/or 5, more preferably one or more metals contained in Groups 7 to 11, in particular in periods 4 to 6, in particular in periods 4 and/or 5, wherein it is even further preferred that the term "transition metal" designates one or more metals contained in groups 7 to 11 of the periodic table and in particular in periods 4 to 6, preferably in periods 4 and/or 5.

Consequently, the transition metal contained in the zeolitic material having a BEA-type framework structure employed in step (2) of the inventive process preferably designates one or more transition metals according to particular and preferred meanings of the term "transition metal" as defined in the present application. According to particularly preferred embodiments of the present invention, the zeolitic material contains one or more transition metals selected from the group consisting of Co, Ni, Cu, Fe, Ag, Au, Pt, Pd, Rh and combinations of two or more thereof, more preferably from the group consisting of Co, Ni, Cu, Fe, and combinations of two or more thereof, more preferably from the group consisting of Co, Cu, Fe, and combinations of two or more thereof, wherein even more preferably, the zeolitic material contains Cu and/or Fe, preferably Fe.

As regards the transition metal which is contained in the zeolitic material employed in step (2) of the inventive process, there is no particular restriction as to how said transition metal is actually contained in the zeolitic material. Thus, the transition metal may be contained in the zeolitic material as a framework element, as a non-framework element, or as both a framework element and a non-framework element. According to embodiments wherein the zeolitic material contains two or more types of transition metals, same applies independently for each of the transition metal elements contained in the zeolitic material, such that any one thereof may be contained in the zeolitic material either as framework element or as non-framework element or as both a framework element and a non-framework element independently thereof as to whether the one or more further types of transition metals contained in the zeolitic material is contained therein as a framework element, as a non-framework element or as both a framework and as a non-framework element, respectively. According to preferred embodiments of the present invention, however, the one or more transition metals contained in the zeolitic material are contained therein at least in part as non-framework elements, wherein even more preferably the one or more transition metals are contained in the zeolitic material having a BEA-type framework structure as non-framework elements. Within the meaning of the present invention, the term "framework element" refers to an element contained in the framework structure of the zeolitic material whereas non-framework elements refer to elements which are present in the pores and cavities formed by the framework structure and typical for zeolitic materials in general.

As noted above, there is no particular restriction according to the present application as to the amount of the one or more transition metal contained in the zeolitic material employed in step (2) of the inventive process. Thus, in principle, the zeolitic material may contain any suitable amount of the one or more transition metals, provided that the contacting of the gas stream provided in step (1) of the inventive process with the zeolitic material in step (2) allows for the treatment at least in part of at least one of the nitrogen oxides contained in the gas stream. Expressed in terms of the molar ratio of the one or more transition metals to X$_2$O$_3$, the zeolitic material may, by way of example, display a molar ratio comprised in the range of anywhere from 0.005 to 10, wherein preferably the molar ratio is comprised in the range of from 0.01 to 5, more preferably from 0.05 to 2.5, more preferably from 0.075 to 1.5, and even more preferably from 0.1 to 1. According to particularly preferred embodiments of the present invention, the Fe:X$_2$O$_3$ molar ratio of the zeolitic material ranges from 0.2 to 0.7.

In the present invention, the zeolitic material is characterized by its framework structure type, and according by its X-ray diffraction pattern of which the reflections are characteristic of a material having the BEA-type framework structure. In this respect, there is again no particular restriction, neither with respect to the reflections comprised in the X-ray diffraction pattern of the zeolitic material used in step (2) of the inventive process, nor with respect to their relative intensities provided that the pattern comprises reflections typical of the BEA-type framework and that the zeolitic material is suited for the conversion at least in part of one or more of the nitrogen oxides contained in the gas stream provided in step (1). According to particularly preferred embodiments, however, the zeolitic material having a BEA-type framework structure display an X-ray diffraction pattern comprising at least the following reflections:

| Intensity (%) | Diffraction angle 2θ/° [Cu K(alpha 1)] |
|---|---|
| [11-31] | [21.07-21.27] |
| 100 | [22.12-22.32] |
| [13-33] | [25.01-25.21] |
| [17-37] | [25.53-25.73] |
| [13-33] | [26.78-26.98] |
| [11-31] | [28.39-28.59] |
| [22-42] | [29.24-29.44] |
| [6-26] | [30.00-30.20] |
| [9-29] | [32.86-33.26] |
| [11-31] | [42.90-43.30] | wherein 100% relates to the intensity of the maximum peak in the X-ray powder diffraction pattern.

According to embodiments of the present invention which are yet further preferred, the zeolitic material having a BEA-type framework structure has an X-ray diffraction pattern comprising at least the following reflections:

| Intensity (%) | Diffraction angle 2θ/° [Cu K(alpha 1)] |
|---|---|
| [11-31] | [21.12-21.22] |
| 100 | [22.17-22.27] |
| [13-33] | [25.06-25.16] |
| [17-37] | [25.58-25.68] |
| [13-33] | [26.83-26.93] |
| [11-31] | [28.44-28.54] |
| [22-42] | [29.29-29.39] |
| [6-26] | [30.05-30.15] |
| [9-29] | [33.01-33.11] |
| [11-31] | [43.05-43.15] | wherein 100% relates to the intensity of the maximum peak in the X-ray diffraction.

As noted in the foregoing, the zeolitic material employed in the inventive process is a zeolitic material which is obtainable from organotemplate-free synthesis according to particular and preferred meanings of the present application. As regards the organotemplate-free process from which the zeolitic material is obtainable, no particular restriction applies in the present invention as to the process which may be employed or from which the zeolitic material is obtainable, provided that it is an organotemplate-free process within the meaning of the present invention, and that it is suitable for being used in the inventive process, in particular with respect to the treatment of at least a portion of one or more of the nitrogen oxides in step (2). According to a preferred embodiment of the present invention, the zeolitic material having a BEA-type framework structure comprises $YO_2$ and $X_2O_3$ and is obtainable by a process comprising the steps of (I) preparing a mixture comprising one or more sources for $YO_2$, one or more sources for $X_2O_3$, and seed crystals comprising one or more zeolitic materials having a BEA-type framework structure;

(II) crystallizing the mixture obtained in step (I); and (III) subjecting the zeolitic material having a BEA-type framework structure obtained in step (II) to an ion-exchange procedure with one or more transition metals;

wherein Y is a tetravalent element, and X is a trivalent element, and wherein the mixture provided in step (I) and crystallized in step (II) does not contain an organotemplate as structure-directing agent.

According to the preferred process from which the transition metal containing zeolitic material is obtainable, there is no particular restriction as to the number and/or types of zeolitic materials which are obtained in step (II) of the process, provided that they have the BEA framework structure and comprise $YO_2$ and $X_2O_3$. Thus, by way of example, the zeolitic material may comprise one or more zeolites having the BEA framework structure which are selected from the group consisting of zeolite beta, [B—Si—O]-BEA, [Ga—Si—O]-BEA, [Ti—Si—O]-BEA, Al-rich beta, CIT-6, tschernichite, and pure silica beta, wherein preferably the zeolitic material obtained in step (II) comprises zeolite beta, wherein even more preferably the zeolitic material having a BEA-type framework structure is zeolite beta.

In the preferred process from which the transition metal containing zeolitic material is obtainable, a zeolitic material having a BEA-type framework structure is obtained in step (II). Said material comprises $YO_2$, wherein Y stands for any conceivable tetravalent element, Y standing for either one or several tetravalent elements. Preferred tetravalent elements according to the present invention include Si, Sn, Ti, Zr, and Ge, and combinations thereof. More preferably, Y stands for Si, Ti, or Zr, or any combination of said trivalent elements, even more preferably for Si and/or Sn. According to the present invention, it is particularly preferred that Y stands for Si.

According to the preferred process from which the transition metal containing zeolitic material is obtainable, $YO_2$ can be provided in step (I) in any conceivable form, provided that a zeolitic material having a BEA-type framework structure comprising $YO_2$ can be crystallized in step (II). Preferably, $YO_2$ is provided as such and/or as a compound which comprises $YO_2$ as a chemical moiety and/or as a compound which (partly or entirely) is chemically transformed to $YO_2$ during the inventive process. In preferred embodiments of the preferred process, wherein Y stands for Si or for a combination of Si with one or more further tetravalent elements, the source for $SiO_2$ provided in step (I) can be any conceivable source. There can therefore be used, for example, all types of silica and silicates, preferably fumed silica, silica hydrosols, reactive amorphous solid silicas, silica gel, silicic acid, water glass, sodium metasilicate hydrate, sesquisilicate or disilicate, colloidal silica, pyrogenic silica, silicic acid esters, tetraalkoxysilanes, or mixtures of two or more of these compounds.

In particularly preferred embodiments of the preferred process from which the transition metal containing zeolitic material is obtainable, wherein the mixture according to step (I) comprises one or more sources for $SiO_2$, said source preferably comprises one or more compounds selected from the group consisting of silica and silicates, preferably silicates, more preferably alkali metal silicates. Among the preferred alkali metal silicates, the alkali metal is preferably selected from the group consisting of Li, Na, K, Rb, and Cs, wherein more preferably the alkali metal is Na and/or K, and wherein even more preferably the alkali metal is Na. According to particularly preferred embodiments, the one or more sources for $SiO_2$ preferably comprised in the mixture provided in step (I) comprises water glass, preferably sodium and/or potassium water glass, and even more preferably sodium water glass. According to said embodiments, it is yet further preferred that the one or more sources for $SiO_2$ comprise sodium and/or potassium silicate, and even more preferably sodium silicate, wherein in particularly preferred embodiments of the present invention, the source for $SiO_2$ is sodium silicate.

According to alternative embodiments which are particularly preferred, the one or more sources for $YO_2$ comprise one or more further sources for $YO_2$ in addition to one or more silicates, and in particular one or more further sources for $SiO_2$ in addition thereto. In this respect there is no particular restriction as to the one or more additional sources for $YO_2$, and preferably for $SiO_2$, which may be used in addition to one or more silicates, provided that an organotemplate-free zeolitic material having a BEA-type framework structure may be crystallized in step (II). Thus, by way of example, the additional one or more sources for $SiO_2$ may include any one of silica, preferably fumed silica, silica hydrosols, reactive amorphous solid silicas, silica gel, silicic acid, colloidal silica, pyrogenic silica, silicic acid esters, tetraalkoxysilanes, or mixtures of two or more of these compounds. According to particularly preferred embodiments, the one or more additional sources for $SiO_2$ comprises one or more silicas. By way of example, the one or more silicas additionally used may include fumed silica, silica hydrosols, reactive amorphous solid silicas, silica gel, colloidal silica, pyrogenic silica, or mixtures of two or more of these compounds. It is, however, preferred according to the present invention that the one or more silicas additionally used include one or more silica hydrosols and/or one or more colloidal silicas, and even more preferably one or more colloidal silicas.

Thus, according to the preferred process from which the transition metal containing zeolitic material is obtainable, embodiments are particularly preferred wherein the one or more sources for $YO_2$ provided in step (I) comprise one or more silicates, preferably one or more alkali metal silicates, wherein the alkali metal is preferably selected from the group consisting of Li, Na, K, Rb, and Cs, wherein more preferably the alkali metal is Na and/or K, and wherein even more preferably the alkali metal is Na. Furthermore, according to said particularly preferred embodiments, it is further preferred that the one or more sources for $YO_2$ further comprise one or more silicas in addition to the one or more silicates, preferably one or more silica hydrosols and/or one or more colloidal silicas, and even more preferably one or more colloidal silicas in addition to the one or more silicates. Alternatively or in addition thereto, it is further preferred that the one or more silicates provided in step (I) comprise water glass, preferably sodium and/or potassium silicate, and even more preferably sodium silicate.

Furthermore, as regards the zeolitic material having a BEA-type framework structure obtained in step (II) comprising $X_2O_3$, X may stand for any conceivable trivalent element, X standing for either one or several trivalent elements. Preferred trivalent elements include Al, B, In, and Ga, and combinations thereof. More preferably, Y stands for Al, B, or In, or any combination of said trivalent elements, even more preferably for Al and/or B, wherein it is particularly preferred that X stands for Al.

If, for example, boron is incorporated, for example free boric acid and/or borates and/or boric esters, such as, for example, triethyl borate or trimethyl borate, can be used as starting materials.

Concerning the one or more sources for $X_2O_3$ which are provided in step (I), there is no particular restriction as the $X_2O_3$ can be provided in any conceivable form, provided that a zeolitic material having a BEA-type framework structure comprising $X_2O_3$ can be crystallized in step (II). Preferably, $X_2O_3$ is provided as such and/or as a compound which comprises $X_2O_3$ as a chemical moiety and/or as a compound which (partly or entirely) is chemically transformed to $X_2O_3$ during the inventive process.

In more preferred embodiments of the preferred process from which the transition metal containing zeolitic material is obtainable, wherein X stands for Al or for a combination of Al with one or more further trivalent elements, the source for $Al_2O_3$ provided in step (I) can be any conceivable source. There can be used for example any type of alumina and aluminates, aluminum salts such as, for example, alkali metal aluminates, aluminum alcoholates, such as, for example, aluminum triisopropylate, or hydrated alumina such as, for example, alumina trihydrate, or mixtures thereof. Preferably, the source for $Al_2O_3$ comprises at least one compound selected from the group consisting of alumina and aluminates, preferably aluminates, more preferably alkali metal aluminates. Among the preferred alkali metal aluminates, the at least one source preferably comprises sodium and/or potassium aluminate, more preferably sodium aluminate. In particularly preferred embodiments of the present invention, the source for $Al_2O_3$ is sodium aluminate.

As to the amounts of the one or more sources for $YO_2$ and $X_2O_3$ respectively provided in step (I), no particular restrictions apply in the preferred process from which the transition metal containing zeolitic material is obtainable, provided that an organotemplate-free zeolitic material having a BEA-type framework structure comprising both $YO_2$ and $X_2O_3$ may be crystallized in step (II). Thus, by way of example, the $YO_2:X_2O_3$ molar ratio of the mixture according to step (I) may range anywhere from 1 to 200, wherein preferably the $YO_2:X_2O_3$ molar ratio of the mixture ranges from 5 to 100, more preferably from 10 to 50, more preferably from 15 to 40, more preferably from 20 to 30, and even more preferably from 23 to 25. According to particularly preferred embodiments of the present invention, the $YO_2:X_2O_3$ molar ratio of the mixture provided in step (I) is comprised in the range of from 23.5 to 24.

In embodiments of the preferred process from which the transition metal containing zeolitic material is obtainable which are further preferred, the zeolitic material obtained in step (II) comprises one or more alkali metals M, wherein M is preferably selected from the group consisting of Li, Na, K, Cs, and combinations of two or more thereof. According to particularly preferred embodiments, the one or more alkali metals M are selected from the group consisting of Li, Na, K, and combinations of two or more thereof, wherein even more preferably the alkali metal M is Na and/or K, and even more preferably Na. In particularly preferred embodiments of the preferred process, the alkali metal is partly or entirely contained in the at least one source for $YO_2$ and/or $X_2O_3$ provided in step (I), wherein preferably, the alkali metal is entirely contained therein.

In general, the alkali metal M can be contained in the mixture according to step (I) of the preferred process in any conceivable amount, provided that a zeolitic material having a BEA-type framework structure is crystallized in step (II). Thus, by way of example, the $M:YO_2$ molar ratio in the mixture provided in step (I) may range anywhere from 0.05 to 5, wherein preferably the mixture provided in step (I) and crystallized in step (II) displays a $M:YO_2$ molar ratio comprised in the range of from 0.1 to 2, more preferably or from 0.3 to 1, more preferably of from 0.4 to 0.8, more preferably of from 0.45 to 0.7, and even more preferably from 0.5 to 0.65. According to particularly preferred embodiments, the $M:YO_2$ molar ratio in the mixture according to step (I) ranges from 0.55 to 0.6

Thus, in general, any conceivable amounts of one or more sources for $YO_2$, of the one or more sources for $X_2O_3$, and of the one or more alkali metals M optionally comprised in the mixture provided in step (I) can be used in the preferred process, again provided that an organotemplate-free zeolitic material having a BEA-type framework structure may be crystallized in step (II). Thus, by way of example, the $YO_2:X_2O_3:M$ molar ratios in the mixture according to step (I) may range anywhere from (1 to 200):1:(0.5 to 100). It is, however, preferred that the $YO_2:X_2O_3:M$ molar ratios displayed by the mixture provided in step (I) and crystallized in step (II) are comprised in the range of from (5 to 100):1:(5 to 75), more preferably of from (10 to 50):1:(8 to 50), more preferably of from (15 to 40):1:(10 to 30), more preferably of from (20 to 30):1:(11 to 20), and even more preferably of from (23 to 25):1:(12 to 15). According to particularly preferred embodiments, the $YO_2:X_2O_3:M$ molar ratio of the mixture provided in step (I) and crystallized in step (II) is comprised in the range of from (23.5 to 24):1:(13 to 14).

According to the preferred process of the present invention, seed crystals are provided in step (I), wherein said seed crystals comprise a zeolitic material having a BEA-type framework structure. In general, said seed crystals can comprise any zeolitic material having a BEA-type framework structure, provided that a zeolitic material having a BEA-type framework structure is crystallized in step (II).

Preferably, the zeolitic material having a BEA-type framework structure comprised in the seed crystals is a zeolitic material obtained according to the preferred process from which the transition metal containing zeolitic material is obtainable. More preferably, the zeolitic material having a BEA-type framework structure comprised in the seed crystals is the same as the zeolitic material having a BEA-type framework structure which is then crystallized in step (II). Particularly preferred are seed crystals comprising zeolite beta, more preferably zeolite beta which has been obtained according to the inventive process. In particularly preferred embodiments, the seed crystals are zeolite beta crystals, preferably zeolite beta crystals obtained according to the preferred process.

In the preferred process from which the transition metal containing zeolitic material is obtainable, any suitable amount of seed crystals can be provided in the mixture according to step (I), provided that a zeolitic material having a BEA-type framework structure is crystallized in step (II). In general, the amount of seed crystals contained in the mixture according to step (I) ranges from 0.1 to 30 wt.-% based on 100 wt.-% of $YO_2$ in the at least one source for $YO_2$, wherein preferably from 0.5 to 20 wt.-% of seed crystals are provided in the mixture crystallized in step (II). More preferably, the amount of seed crystals contained in the mixture according to step (I) ranges from 1 to 10 wt.-%, more preferably from 1.5 to 5 wt.-%, and even more preferably from 2 to 4 wt.-%. According to particularly preferred embodiments, the amount of seed crystals provided in the mixture according to step (I) ranges from 2.5 to 3.5 wt.-%

In step (I) according to the preferred process, the mixture can be prepared by any conceivable means, wherein mixing by agitation is preferred, preferably by means of stirring.

According to the preferred process, the mixture according to step (I) preferably further comprises one or more solvents. In this respect, any conceivable solvents may be used in any suitable amount, provided that a zeolitic material having a BEA-type framework structure comprising $YO_2$ and $X_2O_3$ can be obtained from crystallization in step (II). Thus, by way of example, the one or more solvents may be chosen from water, organic solvents, and mixtures thereof, preferably from the group consisting of deionized water, alcohols, and mixtures thereof. More preferably from the group consisting of deionized water, methanol, ethanol, propanol, and mixtures thereof. According to particularly preferred embodiments, only water and preferably only deionized water is contained in the mixture according to step (I) as the solvent.

As regards the amount of the one or more solvents preferably provided in the mixture according to step (I) of the preferred process, again, no particular restriction applies provided that an organotemplate-free zeolitic material having a BEA-type framework structure comprising $YO_2$ and $X_2O_3$ may be crystallized in step (II). Thus, by way of example, according to particularly preferred embodiments wherein the solvent comprises water, the $H_2O:YO_2$ molar ratio of the mixture may range anywhere from 5 to 100, wherein preferably, the $H_2O:YO_2$ molar ratio is comprised in the range of from 10 to 50, more preferably of from 13 to 30, and even more preferably of from 15 to 20. According embodiments of the preferred process which are particularly preferred, the $H_2O:YO_2$ molar ratio of the mixture provided in step (I) and crystallized in step (II) of the inventive process is comprised in the range of from 17 to 18.

In general, step (II) according to the preferred process can be conducted in any conceivable manner, provided that a zeolitic material having a BEA-type framework structure is crystallized from the mixture according to step (I). The mixture can be crystallized in any type of vessel, wherein a means of agitation is preferably employed, preferably by rotation of the vessel and/or stirring, and more preferably by stirring the mixture.

According to the preferred process, the mixture is preferably heated during at least a portion of the crystallization process in step (II). In general, the mixture can be heated to any conceivable temperature of crystallization, provided that a zeolitic material having a BEA-type framework structure is crystallized from the mixture. Preferably, the mixture is heated to a temperature of crystallization ranging from 80 to 200° C., more preferably from 90 to 180° C., more preferably from 100 to 160° C., more preferably from 110 to 140° C., and even more preferably from 115 to 130° C.

The preferred heating in step (II) of the preferred process can be conducted in any conceivable manner suitable for the crystallization of a zeolitic material having a BEA-type framework structure. In general, heating may be conducted at one temperature of crystallization or vary between different temperatures. Preferably, a heat ramp is used for reaching the temperature of crystallization, wherein the heating rate preferably ranges from 10 to 100° C./h, more preferably from 20 to 70° C./h, more preferably from 25 to 60° C./h, more preferably from 30 to 50° C./h, and even more preferably from 35 to 45° C./h.

In preferred embodiments of the preferred process, the mixture according to step (I) is subjected in step (II) to a pressure which is elevated with regard to normal pressure. In embodiments of the preferred process wherein a solvent is present in the mixture according to step (I), it is furthermore preferred that heating in step (II) is conducted under solvothermal conditions, meaning that the mixture is crystallized under autogenous pressure of the solvent which is used, for example by conducting heating in an autoclave or other crystallization vessel suited for generating solvothermal conditions. In particularly preferred embodiments wherein the solvent comprises or consists of water, preferably of deionized water, heating in step (II) is accordingly preferably conducted under hydrothermal conditions.

The apparatus which can be used for crystallization in the preferred process from which the transition metal containing zeolitic material is obtainable is not particularly restricted, provided that the desired parameters for the crystallization process can be realized, in particular with respect to the preferred embodiments requiring particular crystallization conditions. In the preferred embodiments conducted under solvothermal conditions, any type of autoclave or digestion vessel can be used.

In general, the duration of the crystallization process in step (II) of the preferred process is not particularly limited. In preferred embodiments involving heating of the mixture according to step (I), said crystallization process is conducted for a period ranging from 5 to 200 h, more preferably from 20 to 160 h, more preferably from 60 to 140 h, and even more preferably from 100 to 130 h.

According to preferred embodiments of the preferred process wherein the mixture is heated in step (II), said heating may be conducted during the entire crystallization process or during only one or more portions thereof, provided that a zeolitic material having the BEA-type framework structure is crystallized. Preferably, heating is conducted during the entire duration of crystallization.

In general, the process of the preferred process can optionally comprise further steps for the work-up and/or further physical and/or chemical transformation of the zeolitic material having a BEA-type framework structure crystallized in step (II) from the mixture provided in step (I). The crystallized material can for example be subject to any number and sequence of isolation and/or washing and/or drying procedures, wherein the zeolitic material obtained from crystallization in step (II) is preferably subject to one or more isolation procedures, more preferably to one or more isolation and one or more washing procedures, and even more preferably to one or more isolation, one or more washing, and one or more drying procedures.

As regards preferred embodiments of the preferred process wherein the organotemplate-free zeolitic material crystallized in step (II) is subject to one or more isolation procedures, said isolation of the crystallized product can be achieved by any conceivable means. Preferably, isolation of the crystallized product is achieved by means of filtration, ultrafiltration, diafiltration, centrifugation and/or decantation methods, wherein filtration methods can involve suction and/or pressure filtration steps.

With respect to the one or more optional washing procedures, any conceivable solvent can be used. Washing agents which may be used are, for example, water, alcohols, such as methanol, ethanol or propanol, or mixtures of two or more thereof. Examples of mixtures are mixtures of two or more alcohols, such as methanol and ethanol or methanol and propanol or ethanol and propanol or methanol and ethanol and propanol, or mixtures of water and at least one alcohol, such as water and methanol or water and ethanol or water and propanol or water and methanol and ethanol or water and methanol and propanol or water and ethanol and propanol or water and methanol and ethanol and propanol. Water or a mixture of water and at least one alcohol, preferably water and ethanol, is preferred, deionized water being very particularly preferred as the only washing agent.

Preferably, the separated zeolitic material is washed until the pH of the washing agent, preferably the washwater, is in the range of from 6 to 8, preferably from 6.5 to 7.5, as determined via a standard glass electrode.

Furthermore, as regards the one or more optional drying steps, in principle, any conceivable means of drying can be used. The drying procedures however preferably include heating and/or applying vacuum to the zeolitic material having a BEA-type framework structure. In alternatively preferred embodiments of the preferred process, the one or more drying steps may involve spray drying, and preferably spray granulation of the zeolitic material crystallized in step (II) of the inventive process.

In embodiments which comprise at least one drying step, the drying temperatures are preferably in the range of from 25° C. to 150° C., more preferably of from 60 to 140° C., more preferably of from 70 to 130° C. and even more preferably in the range of from 75 to 125° C. The durations of drying are preferably in the range of from 2 to 60 h, more preferably in the range of 6 to 48 hours, and even more preferably of from 12 to 24 h.

In general, the optional washing and/or drying procedures comprised in the preferred process can be conducted in any conceivably order and repeated as often as desired.

Thus, according to the preferred process from which the transition metal containing zeolitic material is obtainable, it is preferred that after step (II) and prior to step (III) said process further comprises one or more of the following steps of:
(A) isolating the zeolitic material having a BEA-type framework structure obtained in step (II), preferably by filtration; and
(B) optionally washing the zeolitic material having a BEA-type framework structure obtained in step (II); and/or
(C) optionally drying the zeolitic material having a BEA-type framework structure obtained in step (II);
wherein the steps (A) and/or (B) and/or (C) can be conducted in any order, and
wherein one or more of said steps is preferably repeated one or more times.

Preferably, the preferred process comprises at least one step (A) of isolating the zeolitic material crystallized according to step (II), more preferably by filtration thereof. According to the preferred process it is further preferred that after the at least one step (A) of isolation, the zeolitic material is subject to at least one step (C) of drying, wherein more preferably the zeolitic material is subject to at least one step (B) of washing prior to the at least one drying step. In a particularly preferred embodiment, the zeolitic material crystallized according to step (II) is subject to at least one step (A) of isolating, followed by at least one step (B) of washing, followed by at least one step (C) of drying.

According to a further embodiment of the preferred process from which the zeolitic material is obtainable which is alternatively preferred, the zeolitic material crystallized in step (II) is directly subject to one or more steps of drying, preferably to one or more steps of spray drying or of spray granulation, wherein it is particularly preferred that said one or more steps of spray drying or spray granulation are performed without isolating or washing the zeolitic material beforehand. Directly subjecting the mixture obtained from step (II) of the inventive process to a spray drying or spray granulation stage has the advantage that isolation and drying is performed in a single stage. Consequently, according to this embodiment of the preferred process, a particularly preferred process is provided wherein not only removal of organotemplate compounds is avoided, but also the number of post-synthesis workup steps is minimized, as a result of which the organotemplate-free zeolitic material having a BEA-type framework structure can be obtained from a highly simplified process.

According to the preferred process, the zeolitic material crystallized in step (II) is subject to one or more ion-exchange procedures, wherein the term "ion-exchange" according to the present invention generally refers to non-framework ionic elements and/or molecules contained in the zeolitic material. More specifically, according to the present invention the zeolitic material crystallized in step (II) is ion-exchanged with one or more transition metals according to the particular and preferred embodiments of the present invention, and particularly preferable with iron.

As regards the ion-exchange procedure performed in step (III) of the preferred process, there is no particular restriction neither regarding the specific impregnation method which is applied, nor with respect to whether said step is repeated and, if yes, the number of times said step is repeated. Thus, by way of example, ion-exchange may be conducted with the aid of a solvent or solvent mixture in which the ion to be exchanged is suitably dissolved. With respect to the type of solvent which may be used, there is again no particular restriction in this respect, provided that the ions to be exchanged may be solvated therein. Thus, by way of example, the solvent or mixture of solvents which may be used include water and alcohols, and in particular short chain alcohols selected among $C_1$-$C_4$, and preferably $C_1$-$C_3$ alcohols, in particular methanol, ethanol or propanol, including mixtures of two or more thereof. Examples of mixtures are mixtures of two or more alcohols, such as methanol and ethanol or methanol and propanol or ethanol and propanol or methanol and ethanol and propanol, or mixtures of water and at least one alcohol such as water and methanol or water and ethanol or water and propanol or water and methanol and ethanol or water and methanol and propanol or water and ethanol and propanol or water and methanol and ethanol and propanol. According to the preferred process, however, water or a mixture of water and one or more alcohols is preferred, wherein a mixture of water and ethanol is further preferred, deionized water being particularly preferred as the solvent for the one or more ion-exchange procedures conducted in step (III).

As regards the amount of the one or more solvents preferably used in the ion-exchange procedure according to step (III), there is again no particular restriction according to the preferred process, provided that the one or more transition metals may be effectively exchanged as non-framework elements in the zeolitic material obtained in step (II). Thus, by way of example, an excess of solvent or solvent mixture may be used in the ion-exchange procedure according to step (III) wherein solvated transition metals may enter the porous system of the zeolitic material obtained in step (II) and, in counterpart, ions contained in the zeolitic material against which the one or more transition metal is exchanged are suitably solvated in the solvent or solvent mixture and accordingly allowed to exit the porous system of the zeolitic material. Alternatively, however, ion-exchange may be achieved with a volume of solvent or a solvent mixture which slightly exceeds or approximately corresponds to or is slightly inferior to the porous volume of the zeolitic material such that the one or more transition metals solvatized in the solvent or solvent mixture enters the porous system of the zeolitic material by capillary action according to an insipient wetness impregnation technique. In particular, according to specific embodiments of the present invention which employs said ion-exchange technique, the ion-exchange process directly takes place within the porous system of the zeolitic material obtained in step (II) without any ions necessarily leaving the zeolitic material via excess solvent. According to the present invention, however, it is preferred that the ion-exchange procedure in step (III) is conducted with an excess of solvent or solvent mixture, wherein, by way of example, a liquid to solid weight ratio ranging anywhere from 0.1 to 20 may be used. According to said preferred embodiments of the present invention, however, it is preferred that the liquid to solid weight ratio being the weight ratio of the solvent or solvent mixture to the zeolitic material obtained in step (II), is comprised in the range of from 1 to 15, more preferably of from 2 to 12, more preferably of from 3 to 10, more preferably of from 4 to 9, and even more preferably of from 5 to 8. According to particularly preferred embodiments of the present invention, the liquid to solid weight ratio employed in the ion-exchange procedure of step (III) is comprised in the range of from 6 to 7.

According to the preferred process, the total amount of the one or more transition metals which is ion-exchanged into the material obtained in step (III) is preferably comprised in the range of from 0.1 to 25 wt.-% calculated as the respective metal oxide, i.e. according to the particularly preferred embodiments of zeolitic material comprising Co, Ni, Cu, Fe, Ag, Au, Pt, Pd, Rh and combinations of two or more thereof as the one or more transition metals as CoO, NiO, CuO, $Fe_2O_3$, $Ag_2O$, $Au_2O_3$, $PtO_2$, PdO, and $Rh_2O_3$, respectively, with 100 wt.-% referring to the total mass of the ion-exchanged material. Consequently, the type of ion-exchange procedure employed in step (III) is suitably chosen, in particular also with respect to the type and/or amount of solvent or solvent mixture preferably used therein, and repeated one or more times if necessary for achieving a suitable loading of the one or more transition metals in the ion-exchanged material, and preferably for achieving a loading which is comprised by the aforementioned preferred wt.-% ranges. According to the preferred invention it is further preferred that the total amount of the one or more transition metals in the ion-exchanged material obtained in step (III) is comprised in the range of from 0.1 to 20 wt.-%, more preferably of from 0.25 to 15 wt.-%, more preferably of from 0.5 to 10 wt.-%, more preferably of from 1 to 8 wt.-%, more preferably of from 2 to 7 wt.-%, more preferably of from 3 to 6 wt.-%, and even more preferably of from 4 to 6 wt.-%. According to particularly preferred embodiments of the invention, the total amount of the one or more transition metals is comprised in the range of from 4.5 to 5.5 wt.-%.

It is further preferred according to the preferred process that the zeolitic material crystallized in step (II) is ion-exchanged in step (III) with one or more transition metals selected from the group consisting of Co, Ni, Cu, Fe, Ag, Au, Pt, Pd, Rh and combinations of two or more thereof, more preferably from the group consisting of Co, Ni, Cu, Fe, and combinations of two or more thereof, more preferably from the group consisting of Co, Cu, Fe, and combinations of two or more thereof, wherein even more preferably, the zeolitic material is ion-exchange with Cu and/or Fe, and preferably with Fe. According to particularly preferred embodiments of the preferred process wherein the zeolitic material is ion-exchanged in step (III) with iron alone, there is no particular restriction as to the amount of iron in the ion-exchange material obtained in step (III). According to preferred embodiments of the preferred process from which the zeolitic material employed in step (2) of the inventive process is obtainable, it is however preferred that the total amount thereof is comprised in the range of from 0.1 to 25 wt.-% calculated as $Fe_2O_3$. According to further preferred embodiments, the total amount of iron is comprised in the range of from 0.1 to 20 wt.-%, more preferably of from 0.25 to 15 wt.-%, more preferably of from 0.5 to 10 wt.-%, more preferably of from 1 to 8 wt.-%, and even more preferably of from 4 to 6. According to particularly preferred embodiments thereof, the total amount of iron which is ion-exchanged in step (III) is comprised in the range of from 3 to 5.5 wt.-% calculated as $Fe_2O_3$.

As regards the particular transition metal compounds which may be used in the inventive process for ion-exchange in step (III), no particular restriction applies provided that the zeolitic material obtained in step (II) may be ion-exchanged therewith to afford an ion-exchanged zeolitic material. Thus, by way of example, as concerns the iron compounds which may be preferably employed in step (III) of the preferred process as the transition metal, any suitable iron compound or mixture of iron compounds may be used, wherein $Fe^{2+}$ and/or $Fe^{3+}$-ion containing compounds are preferably used, $Fe^{2+}$-containing compounds being most preferably used. By way of further example, as concerns the copper compounds which may be preferably employed in step (III) of the inventive process as the transition metal, any suitable copper compound or mixture of copper compounds may be used, wherein $Cu^{2+}$ and/or $Cu^{+}$-ion containing compounds are preferably used, $Cu^{2+}$-containing compounds being most preferably used. According to preferred embodiments of the preferred process wherein a solvent or solvent mixture is employed in the ion-exchange step (III), the solubility of the one or more transition metals in the solvent or solvent mixture which is used is preferably such, that the concentration of the one or more transition metal in the solvent or solvent mixture is suitable for obtaining a zeolitic material having a transition metal loading according to particular and/or preferred embodiments of the present invention, wherein it is preferred that said loading of the zeolitic material having a BEA-type framework structure as obtained from step (II) is achieved after five or less ion-exchange procedures when using such a solution, preferably after four or less, more preferably after three or less, more preferably after two or three, and even more preferably after only one ion-exchange procedure using such a solution.

Thus, by way of example, according to particularly preferred embodiments of the preferred process wherein the one or more transition metals comprise iron, any suitable iron(II) and/or iron(III) compound, preferably any iron(II) compound, may be employed such as one or more iron(II) and/or iron(III) salts, and more preferably one or more iron(II) salts, selected from the group consisting of iron halides, preferably iron chloride and/or iron bromide, more preferably iron chloride, iron perchlorate, iron sulfite, iron sulfate, iron hydrogensulfate, iron nitrite, iron nitrate, iron dihydrogenphosphate, iron hydrogenphosphate, iron carbonate, iron hydrogencarbonate, iron acetate, iron citrate, iron malonate, iron oxalate, iron tartrate, and mixtures of two or more thereof. Preferably, the one or more iron compounds used for ion-exchange in step (III) of the inventive process is preferably selected from the group consisting of iron chloride and/or iron bromide, preferably iron chloride, iron perchlorate, iron sulfate, iron nitrate, iron acetate, and mixtures of two or more thereof, wherein preferably the one or more iron compound is an iron(II) compound. According to particularly preferred embodiments of the present invention, iron used for ion-exchange in step (III) of the inventive process comprises iron sulfate, preferably iron(II) sulfate, wherein even more preferably iron(II) sulfate is used as the iron compound in step (III).

By further way of example, according to preferred embodiments of the preferred process wherein the one or more transition metals comprise copper, any suitable copper (I) and/or copper(II) compound may be used, wherein preferably a copper(II) compound is used which is preferably a copper(II) salt. Thus, by way of example, one or more copper(II) salts may be used which are selected from the group consisting of copper(II) halides, preferably copper(II) chloride and/or copper(II) bromide, more preferably copper (II) chloride, copper(II) perchlorate, copper(II) sulfite, copper(II) hydrogensulfate, copper(II) sulfate, copper(II) nitrite, copper(II) nitrate, copper(II) dihydrogenphosphate, copper (II) hydrogenphosphate, copper(II) phosphate, copper(II) hydrogencarbonate, copper(II) carbonate, copper(II) acetate, copper(II) citrate, copper(II) malonate, copper(II) oxalate, copper(II) tartrate, and mixtures of two or more thereof, wherein more preferably the copper(II) salt is selected from the group consisting of copper(II) chloride and/or copper(II) bromide, preferably copper(II) chloride, copper(II) sulfate, copper(II) nitrate, copper(II) acetate, and mixtures of two or more thereof. According to particularly preferred embodiments of the present invention, copper used for ion-exchange in step (III) of the inventive process comprises copper(II) acetate, wherein more preferably the copper compound used for ion-exchange is copper(II) acetate.

As outlined in the forgoing, the ion-exchange step (III) may comprise one or more ion-exchange procedures. According to preferred embodiments of the preferred process, the zeolitic material obtained in step (II) of the inventive process is first ion-exchanged with $H^+$ and/or ammonium, preferably with $H^+$, prior to one or more ion-exchange procedures with the one or more transition metals. According to the preferred process, the zeolitic material obtained in step (II) may also be subject to a step of calcination prior to ion-exchange with one or more transition metals in step (III). According to said optional embodiments of the preferred process, wherein the zeolitic material obtained in step (II) is calcined, said calcination may be conducted at any suitable temperature for any conceivable duration provided that the resulting material may be ion-exchanged with one or more transition metals according to particular and preferred embodiments of the present invention. Thus, by way of example, the calcination temperature may range anywhere from 250 to 700° C., wherein the calcination temperature is preferably comprised in the range of from 300 to 600° C., more preferably of from 350 to 550° C., and even more preferably of from 400 to 500° C. According to particularly preferred embodiments of the preferred process including a calcination step prior to ion-exchange, the zeolitic material obtained in step (II) is calcined at a temperature comprised in the range of from 430 to 470° C. prior to ion-exchange with one or more transition metals. Furthermore, as regards the duration of the calcination procedure optionally used prior to ion-exchange in step (III), the calcination may be conducted for a period ranging anywhere from 0.5 to 24 h, wherein preferably the duration of the calcination ranges from 1 to 18 h, more preferably from 2 to 12 h, more preferably from 3 to 10 h, and even more preferably from 3.5 to 8 h. According to particularly preferred embodiments, the calcination procedure performed prior to ion-exchange with one or more transition metals is performed for a duration of from 4 to 6 hours. With respect to the atmosphere in which the calcination is performed, no particular restriction applies, wherein it is preferred that the calcination is performed under nitrogen atmosphere, air, or a mixture thereof. According to a particularly preferred embodiment, the calcination is performed in air.

Thus, according to specific embodiments of the preferred process, the zeolitic material obtained in step (II) may be optionally ion-exchanged with $H^+$ and/or $NH_4^+$, preferably with $H^+$, and/or preferably and optionally calcined prior to ion-exchange in step (III). According to preferred embodiments of the present invention, the zeolitic material obtained in step (II) is first ion-exchanged with $H^+$ prior to ion-exchange in step (III). In this respect, any conceivable ion-exchange procedure such as for example the treatment of the zeolitic material with an acid such as with an acidic medium and in particular with an acidic solution may be employed for achieving the exchange of ionic non-framework elements contained in the zeolitic material obtained in step (II) against $H^+$. According to the present invention it is however particularly preferred that said ion-exchange of non-framework elements against $H^+$ is achieved by first ion-exchanging one or more of the ionic non-framework elements contained in the zeolitic material against ammonium such as by means of contacting the zeolitic material with one or more ammonium-containing solutions, after which the zeolitic material which has been ion-exchanged with ammonium is calcined. According to said particularly preferred embodiments, the ammonium exchange procedure followed by the calcination procedure is repeated one or more times, and preferably repeated twice, thus affording the H-form of the zeolitic material obtained in step (II) of the inventive process.

Therefore, embodiments of the present invention are further preferred wherein the ion-exchange of the zeolitic material having a BEA-type framework structure in step (III) comprises one or more of the steps of:
- (IIIa) optionally exchanging one or more of the ionic non-framework elements contained in the zeolitic material having a BEA-type framework structure obtained in step (II) against $H^+$ and/or $NH_4^+$, preferably against $H^+$; and/or
- (IIIb) optionally calcining the zeolitic material having a BEA-type framework structure obtained in step (II) or (Ma); and/or
- (IIIc) exchanging one or more of the ionic non-framework elements contained in the zeolitic material having a BEA-type framework structure obtained in any of steps (II), (Ma), or (IIIb) against one or more transition metals.

Depending on the specific needs of its application, the transition metal containing zeolitic material having a BEA-type framework structure according to particular and preferred embodiments of the present application can be employed as such, like in the form of a powder, a spray powder or a spray granulate obtained from above-described separation techniques, e.g. decantation, filtration, centrifugation, or spraying.

In many industrial applications, it is often desired on the part of the user not to employ the zeolitic material as powder or sprayed material, i.e. the zeolitic material obtained by the separation of the material from its mother liquor, optionally including washing and drying, and subsequent calcination, but a zeolitic material which is further processed to give moldings. Such moldings are required particularly in many industrial processes, e.g. in many processes wherein the zeolitic material of the present invention is employed as catalyst or adsorbent.

Accordingly, in step (2) of the inventive process, a molding comprising the zeolitic material of the present invention having a BEA-type framework structure is preferably employed for contacting the gas stream provided in step (1) with a transition metal containing zeolitic material in step (2).

In general, the powder or sprayed zeolitic material can be shaped into a molding without any other compounds, e.g. by suitable compacting, to obtain moldings of a desired geometry, e.g. tablets, cylinders, strands (e.g. star-shaped strands), spheres, monolithic structures (e.g. honeycomb structures) or the like.

Preferably, however the zeolitic material is admixed with or coated by a suitable refractory binder. In general, suitable binders are all compounds which impart adhesion and/or cohesion between the zeolitic material particles to be bonded which goes beyond the physisorption which may be present without a binder. Examples of such binders are metal oxides, such as, for example, $SiO_2$, $Al_2O_3$, $TiO_2$, $ZrO_2$ or MgO or clays, or mixtures of two or more of these compounds. Naturally occurring clays which can be employed include the montmorillonite and kaolin family, which families include the subbentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification. In addition, the zeolitic material according to the present invention can be composited with a porous matrix material such as silica-alumina, silica-magnesia, silica-zirconia, silica-thoria, silica-beryllia and silica-titania as well as ternary compositions such as silica-alumina-thoria, silica-alumina-zirconia, silica-alumina-magnesia and silica-magnesia-zirconia.

Also preferably, the zeolitic material, optionally after admixing or coating by a suitable refractory binder as described above, is formed into a slurry, for example with water, which is deposited upon a suitable refractory carrier. The slurry may also comprise other compounds such as, e.g., stabilizers, defoamers, promotors, or the like. Typically, the carrier comprises a member, often referred to as a "honeycomb" carrier, comprising one or more refractory bodies having a plurality of fine, parallel gas flow passages extending therethrough. Such carriers are well known in the art and may be made of any suitable material such as cordierite or the like.

In addition to providing a process for the treatment of a gas stream containing nitrogen oxides, the present invention further relates to an apparatus for the treatment of a gas stream containing nitrogen oxides preferably for applying the inventive process according to any of the particular or preferred embodiments thereof as defined in the present application.

Therefore, the present invention also relates to an apparatus for the treatment of a gas stream containing nitrogen oxides and preferably containing $NO_x$ and/or $N_2O$, the apparatus comprising:
- (i) a catalyst bed provided in fluid contact with the gas stream to be treated;

wherein the catalyst bed comprises a transition metal containing zeolitic material having a BEA-type framework structure, the zeolitic material being obtainable from an organo-template-free synthetic process.

As regards the catalyst bed of the inventive apparatus, said catalyst may be provided in any suitable form provided that fluid contact with the gas stream to be treated may be achieved during operation thereof. Thus, in principle, the catalyst bed may be conceived either as a fixed bed catalyst or as a fluidized bed catalyst wherein combinations of fixed and fluidized bed catalysts may equally be employed according to the present invention. It is, however, preferred that the catalyst bed provided in the inventive apparatus is conceived as a fixed bed catalyst.

Furthermore, regarding the composition of the catalyst provided in the inventive apparatus, there is again no particular restriction provided that the composition is suitable for providing fluid contact of the gas stream with the transition metal containing zeolitic material having a BEA-type framework structure contained in the catalyst bed. Thus, according to particular embodiments of the present invention, the catalyst bed may consist essentially of the transition metal containing zeolitic material having a BEA-type framework structure or, according to alternative embodiments, may contain one or more further components in addition to the aforementioned zeolitic material. According to particularly preferred embodiments of the present invention, the transition metal containing zeolitic material is contained in a molding which then forms the catalyst bed of the inventive apparatus. According to said particularly preferred embodiments, it is further preferred that a molding comprising the transition metal containing zeolitic material forms the catalyst bed of the inventive apparatus, wherein it is particularly preferred that said molding is a molding as defined according to particular and preferred embodiments of the inventive process wherein the transition metal containing zeolitic material employed in step (2) is contained in a molding.

Regarding the transition metal containing zeolitic material contained in the catalyst bed of the inventive apparatus and which is preferably provided in the form of a molding, it is preferred that the zeolitic material used in the inventive apparatus corresponds to any of the particular and preferred embodiments of the present invention relative to the zeolitic material used in the inventive process. Therefore, the zeolitic material contained in the inventive apparatus is preferably a zeolitic material as defined and employed according to any of the particular and preferred embodiments of the present application relative to the inventive treatment of a gas stream containing nitrogen oxides.

In the present invention, it is preferred that the inventive apparatus further comprises one or more devices provided upstream from the catalyst bed, in particular according to preferred embodiments of the present invention wherein the apparatus is designed for the continuous treatment of a gas stream containing nitrogen oxides. According to said preferred embodiments, there is no general restriction as to the number or types of devices which may be employed for injecting one or more reducing agents into the gas stream. According to preferred embodiments, the one or more devices are provided such that their position and design allow for a substantially homogenous mixture of the gas stream and the one or more reducing agents prior to or upon the contacting of the gas stream with at least a portion of the catalyst bed comprising the transition metal containing zeolitic material for the treatment of the nitrogen oxides.

Thus, by way of example, the one or more devices may comprise a pumping mechanism and/or a valve for interrupting the inlet for the one or more reducing agents into the gas stream wherein said pumping device and/or valve is respectively adjusted for providing the desired amount of the one or more reducing agents into the gas stream and/or is connected to a control device which is preferably integrated in a monitoring system for allowing exact control of the rate of introduction of the one or more reducing agents into the gas stream depending on the desired composition of the gas stream upon contacting thereof with at least a portion of the catalyst bed. According to particular embodiments of the present invention wherein two or more different reducing agents are introduced into the gas stream, preferably two or more devices are provided upstream of the catalyst bed in the inventive apparatus, wherein even more preferably the different types of reducing agents are respectively introduced by one or more devices for injecting one of the different types of reducing agents into the gas stream. According to the present invention, it is however particularly preferred that one type of reducing agent or one specific reducing agent composition is employed in the inventive process such that one single device or one or more of the same types of devices are preferably provided upstream of the catalyst bed according to preferred embodiments of the inventive apparatus.

Therefore, according to preferred embodiments of the present invention, the inventive apparatus further comprises:

(ii) one or more devices provided upstream of the catalyst bed for injecting one or more reducing agents into the gas stream.

FIG. 1 shows the X-ray diffraction pattern (measured using Cu K alpha-1 radiation) of the crystalline material obtained according to Example 1, wherein the diffractogram further includes the line pattern of zeolite beta obtained from template-mediated synthesis for comparison. In the figure, the angle 2 theta in ° is shown along the abscissa and the intensities are plotted along the ordinate.

Figure 2:
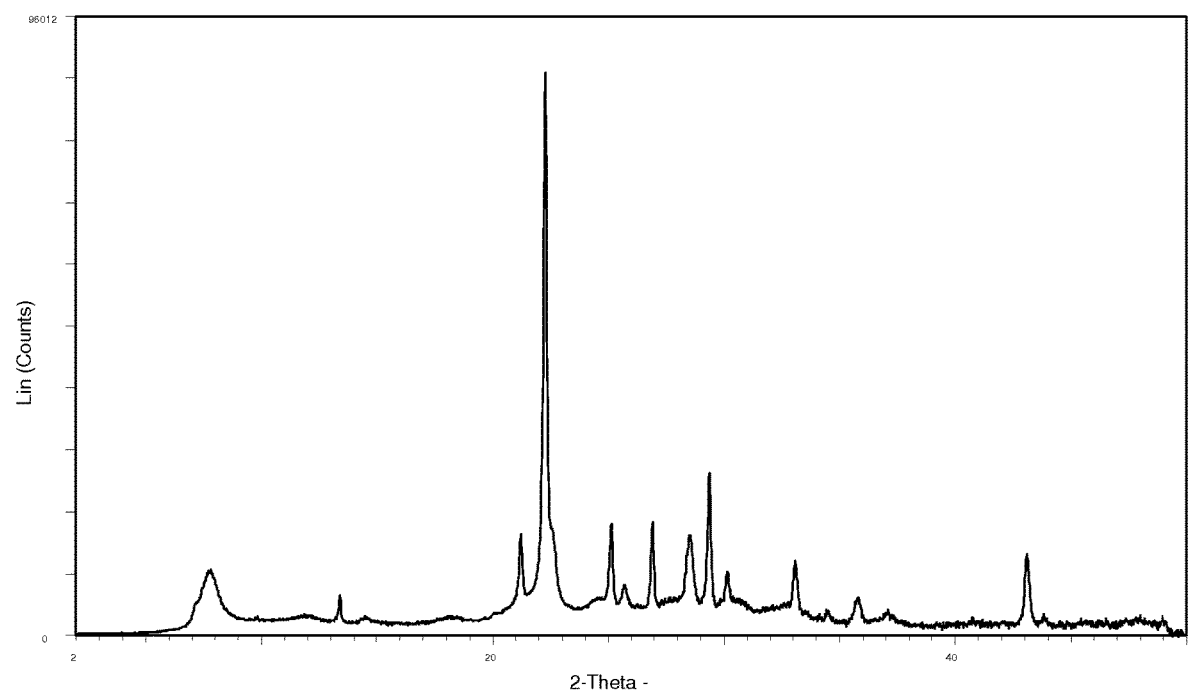
FIG. 2: X-ray diffraction pattern (measured using Cu K alpha-1 radiation) of the crystalline material obtained according to Example A of Example 5.

FIG. 2 shows the X-ray diffraction pattern (measured using Cu K alpha-1 radiation) of the crystalline material obtained according to Example A of Example 5. In the figure, the angle 2 theta in ° is shown along the abscissa and the intensities are plotted along the ordinate.

EXAMPLES

Example 1

Organotemplate-Free Synthesis of Zeolite Beta 335.1 g of NaAlO$_2$ were dissolved in 7,314 g of H$_2$O while stirring, followed by addition of 74.5 g of zeolite beta seeds (Product-Nr. CP814C from Zeolyst International which was converted to the H-form by calcination at 450° C. for 5 h, wherein a heat ramp of 1° C./min was used for attaining the calcination temperature). The mixture was placed in a 20 L autoclave and 7,340 g sodium waterglass solution (26 wt.-% SiO$_2$ and 8 wt.-% Na$_2$O) and 1,436 g Ludox AS40 was added, affording an aluminosilicate gel with a molar ratio of 1.00 SiO$_2$:0.0421 Al$_2$O$_3$:0.285 Na$_2$O: 17.48 H$_2$O. The reaction mixture was heated in 3 h to a temperature of 120° C. using a constant heat ramp, wherein said temperature was then maintained 117 h for crystallization. After having let the reaction mixture cool to room temperature, the solid was separated by filtration, repeatedly washed with deionized water and then dried at 120° C. for 16 h, affording 1,337 g of a white crystalline product.

Chemical analysis showed the material to have an SiO$_2$:Al$_2$O$_3$ molar ratio of 9.93. The sodium content calculated as Na$_2$O was found to be 7.33 wt-% on basis of the calcined material.

FIG. 1 shows the XRD of the crystalline product obtained from the organotemplate-free synthesis of Example 1. In particular, the XRD pattern is typical for a BEA framework structure.

Example 2

Ammonium-Exchange of the Zeolitic Material from Example 1

100.0 g of the sodium form of the crystalline product as obtained from Example 1 were added to a solution of 142.2 g ammonium nitrate dissolved in 657.8 g of deionized water at 80° C. and the slurry was stirred at 300 rpm for 6 h at 80° C. The solid was then filtered hot (without additional cooling) over a Buechner funnel with suitable filter paper. The filter cake then was washed with deionized water until the conductivity of the wash water was below 200 µS cm$^{-1}$. The filter cake was then dried for 16 h at 120° C.

This procedure was repeated twice, thus affording an ion-exchanged crystalline product in its ammonium form. Chemical analysis showed this material to have an SiO$_2$:Al$_2$O$_3$ molar ratio of 10.4.

Example 3

Preparation of the H-Form of Example 2

The ion-exchanged zeolitic material obtained from Example 2 was calcined at 450° C. for 5 h to afford the H-form thereof. Chemical analysis showed this material to have an SiO$_2$:Al$_2$O$_3$ molar ratio of 9.91. The sodium content of the calcined material calculated as Na$_2$O was found to be 0.09 wt-%.

Example 4

Preparation of the H-Form of Example 1

The procedure of Example 2 was repeated, wherein the ion-exchange procedure was only repeated once. The resulting ion-exchanged zeolitic material was accordingly calcined at 450° C. for 5 h to afford the H-form thereof. Chemical analysis showed this material to have an $SiO_2$:$Al_2O_3$ molar ratio of 10.4. The sodium content of the calcined material calculated as $Na_2O$ was found to be 0.80 wt.-%.

Example 5

Iron-Exchange of Examples 2 and 4

Iron-exchanged samples were prepared according to Examples A and B as indicated in Table 1 below. For this purpose, an iron sulfate solution was prepared by dissolving iron(II) sulfate heptahydrate in deionized water, wherein the iron concentration was set as indicated in Table 1 for the respective samples. The respective solutions were heated to 80° C. and the respective zeolite beta starting material was added under stirring in an amount for achieving a weight ratio of the solution to the solid of 6.5, and the temperature of 80° C. was maintained for 2 h. More specifically, as regards the zeolitic starting materials, for Example A the zeolitic material from Example 3 was employed as the starting material, whereas for Example B the zeolitic material from Example 4 was used.

The respective slurry was then filtered hot (without additional cooling) over a Buechner funnel with a suitable filter paper. The filter cake was washed with deionized water until the conductivity of the wash water was below 200 µS cm$^{-1}$. The filter cake was then dried for 16 h at 120° C. Table 1 respectively indicates the $Fe_2O_3$ and $Na_2O$ loadings of all resulting products in wt.-%. Based on the further values from chemical analyses, the molar ratios of $SiO_2$:$Al_2O_3$, Fe:Al, and Fe:H were then respectively calculated, as indicated in Table 1.

TABLE 1

Data for the preparation of and from the chemical analyses of Examples A and B as described in Example 5.

| Starting material | Ex. A Ex. 3 | Ex. B Ex. 4 |
|---|---|---|
| Fe concentration (M) | 0.25 | 0.1 |
| $Fe_2O_3$ (wt.-%) | 5.30 | 3.40 |
| $Na_2O$ (wt.-%) | 0.03 | 0.25 |
| $SiO_2$:$Al_2O_3$ (molar) | 10.71 | 9.90 |
| Fe:Al (molar) | 0.13 | 0.08 |
| Fe:H (molar) | 0.18 | 0.09 |
| moles Fe per 100 g zeolite (moles) | 0.033 | 0.021 |
| Fe Yield (%) | 39 | 61 |

FIG. 2 shows the XRD after iron-exchange of the crystalline product obtained from Example 3 according to Example A of Example 5 as indicated in Table 1.

Example 6

Catalyst Testing

For preparing the catalyst samples for testing, the iron-loaded zeolite beta materials from Examples A and B were mixed with 30 wt.-% of Pural SB based on 100 wt.-% of the resulting mixture which was then molded to 1.5 mm strands. The molded mixture was calcined at 450° C. for 4 hours for obtaining the catalyst samples C and D.

For comparison, a catalyst sample was prepared using the commercial zeolite PB/H 50 (Zeochem) having a silica to alumina ratio of 50. For preparing the catalyst sample, the zeolitic material was impregnated with an iron nitrate solution for affording an iron loading of 2.5 wt.-% after calcination at 450° C. for 4 hours. The iron zeolite was then admixed with 30 wt.-% of Pural SB based on 100 wt.-% of the resulting mixture after which the resulting mixture was extruded for obtaining 1.5 mm strands which were then calcined at 450° C. for 4 hours for obtaining the comparative catalyst sample E.

The catalyst samples were placed in a tube reactor for catalyst testing. For this purpose, a volume of 20 mL of the respective catalyst sample was employed. The reaction was conducted at a pressure of 8 bara (absolute pressure) and a gas hourly space velocity (GHSV) of 20,000 $NL_{gas}/(L_{cat} \times h)$. Incoming and exiting gas streams were analyzed as to their content in $N_2O$ and $NO_x$ using FT-IR-analysis for determining the respective conversion of said nitrogen oxides. The temperature at which the experiment took place was determined with the aid of a sensor placed at the beginning of the catalyst bed.

Test 1: $N_2O$ Abatement

For the $N_2O$ abatement experiment, a gas mixture containing 1,000 ppmv $N_2O$, 3% by volume oxygen, 0.3% by volume $H_2O$ and completing the mixture to 100% by volume using nitrogen was employed. In test runs employing ammonia and propane as reducing agents, a corresponding portion of the nitrogen gas contained in the initial mixture was replaced with the respective reducing agent. As indicated in Table 2, selected tests were run at 350 and 450° C., respectively, using no reducing agent, as well as employing 500 and 2,000 ppmv of propane or ammonia, in the different runs. The term "$conv_{N2O}$" as indicated in the Table designates the conversion of $N_2O$ in the gas stream in % based on the initial content of $N_2O$ in the gas stream prior to the contacting of the catalyst, and the content thereof which is remaining after the contacting of the catalyst sample for the treatment of said nitrogen oxide.

TABLE 2

Results from $N_2O$ abatement testing according to Test 1.

| | | reducing agent (amount) | | | |
|---|---|---|---|---|---|
| Catalyst Sample | Temp. | none $conv_{N2O}$ | propane (500 ppmv) $conv_{N2O}$ | propane (2000 ppmv) $conv_{N2O}$ | ammonia (2000 ppmv) $conv_{N2O}$ |
| Sample C | 350° C. | 0% | 30% | 66% | — |
| | 400° C. | 0% | 53% | 95% | — |
| Sample D | 350° C. | 0% | 9% | 29% | 3% |
| | 400° C. | 2% | 56% | 99% | 38% |
| Sample E (comparative) | 350° C. | 0% | 6% | 22% | — |
| | 400° C. | 0% | 18% | 47% | — |

As may be taken from the results displayed in Table 2, the use of a specific zeolitic material as defined in the inventive process and which in particular is obtainable from an organotemplate-free synthetic process allows for a considerably increased abatement of $N_2O$ compared to a process in which a conventional transition metal containing zeolitic material is used, said material having been obtained from a synthesis employing an organotemplate as structure directing agent.

Test 2: Simultaneous Abatement of $NO_x$ and $N_2O$ Via Selective Catalytic Reduction.

The test runs of Test 1 were repeated wherein a corresponding portion of the nitrogen gas contained in the respective gas mixtures was replaced by $NO_x$ (equilibrium of NO and $N_2O$ in the respective mixture), for affording a starting concentration of 1,000 ppmv of $NO_x$ in the respective samples. As indicated in Table 3, selected tests were run at 350 and 450° C., respectively, using no reducing agent, as well as employing 2,000 ppmv of propane and 500 and 2,000 ppmv ammonia, respectively, in the different runs. As for Test 1, the term "$conv_{N2O}$" as indicated in the Table designates the conversion of $N_2O$ in the gas stream in %, which applies accordingly for the term "$conv_{NOx}$" designating the conversion of $NO_x$ in the gas stream.

TABLE 3

Results from the simultaneous selective catalytic reduction of $N_2O$ and $NO_x$ according to Test 2.

| | | reducing agent (amount) | | | |
|---|---|---|---|---|---|
| Catalyst Sample | Temp. | none $conv_{N2O}/$ $conv_{NOx}$ | propane (2000 ppmv) $conv_{N2O}/$ $conv_{NOx}$ | ammonia (2000 ppmv) $conv_{N2O}/$ $conv_{NOx}$ | ammonia (500 ppmv) $conv_{N2O}/$ $conv_{NOx}$ |
| Sample C | 350° C. | 2%/0% | — | 0%/98% | 0%/53% |
| | 400° C. | 5%/0% | — | 4%/99% | 3%/62% |
| Sample D | 350° C. | 4%/0% | 2%/99% | 7%/99% | — |
| | 400° C. | 14%/0% | 47%/99% | 0%/87% | — |
| Sample E (comparative) | 350° C. | 0%/0% | 0%/62% | — | — |
| | 400° C. | 5%/0% | 0%/74% | — | — |

Referring to the results displayed in Table 2, it is well apparent from the results in Table 3 which were obtained using the comparative Sample E that—as discussed in the introductory portion of the description—the presence of $NO_x$ in a gas stream in addition to $N_2O$ reduces the selectivity of the reduction process taking place at the catalyst (with propane or ammonia being present) and thereby also reduces the $N_2O$ conversion (compared to a similar, but $NO_x$-free gas stream). However, this effect is considerably less pronounced for the samples according to the current invention than for the comparative Sample E. Furthermore, the simultaneous treatment of $NO_x$ in the gas stream using propane is far more effective when using the specific catalyst of the inventive process, in particular due to its considerably higher selectivity towards the selective catalytic reduction of $NO_x$ when using hydrocarbons compared to conventional catalysts such as the one in Sample E which employs a zeolitic material as obtained from organotemplate-directed synthesis.

What is claimed is:

1. Process for the treatment of a gas stream containing nitrogen oxides comprising:
   (1) providing a gas stream comprising $N_2O$ and $NO_x$;
   (2) contacting the gas stream provided in step (1) with a transition metal containing zeolitic material having a BEA-type framework structure for the selective catalytic reduction of both $N_2O$ and $NO_x$;
   wherein the zeolitic material is obtained from an organotemplate-free synthetic process, wherein the gas stream provided in step (1) further comprises one or more reducing agents, wherein the reducing agent does not comprise ammonia or urea; wherein the stoichiometric ratio of the one or more reducing agents to the one or more nitrogen oxides is in the range of from 0.05 to 50;
   wherein the one or more reducing agents comprise one or more hydrocarbons selected from the group consisting of C1 to C6 alkanes;
   and wherein transition metal containing zeolitic material having a BEA-type framework structure is effective for converting greater than 45% of the $N_2O$ and greater than 98% of the NOx at temperatures less than 420° C.,
   said organotemplate-free synthetic process comprising
   (I) preparing a mixture comprising one or more sources for $YO_2$, one or more sources for $X_2O_3$, and seed crystals comprising one or more zeolitic materials having a BEA-type framework structure;
   (II) crystallizing the mixture obtained in step (I); wherein the mixture provided in step (I) and crystallized in step (II) does not contain an organotemplate as structure-directing agent; and
   (IIIa) exchanging one or more of the ionic non-framework elements contained in the zeolitic material having a BEA-type framework structure obtained in step (II) against $NH_4^+$, and
   (IIIb) calcining the zeolitic material having a BEA-type framework structure obtained in step (IIIa) to obtain the hydrogen from zeolite; and
   (IIIc) exchanging one or more of the acidic hydrogens contained in the zeolitic material having a BEA-type framework structure obtained in (IIIb) against Fe, wherein the total amount of the Fe in the ion-exchanged material obtained in step (III) is comprised in the range of from 3 to 6 wt % calculated as $Fe_2O_3$ based on the total mass of the ion exchanged material,
   wherein the nitrogen oxides are comprised in the gas stream to be treated in step (2) in an amount ranging from 1,150 ppmv to 15,000 ppmv.

2. The process of claim 1, wherein the gas stream provided in step (1) comprises $N_2O$ in an amount comprised in the range of from 10 to 10,000 ppmv.

3. The process of claim 1, wherein the gas stream provided in step (1) comprises $NO_x$ in an amount comprised in the range of from 150 to 5,000 ppmv.

4. The process of claim 1, wherein the gas stream provided in step (1) comprises $N_2O$ and $NO_x$ in a molar ratio of $NO_x$:$N_2O$ comprised in the range of from 1:50 to 5:1.

5. The process of claim 1, further comprising one or more additional reducing agents selected from the group consisting of a second hydrocarbon, carbon monoxide, hydrogen, and combinations of two or more thereof.

6. The process of claim 1, wherein the gas stream provided in step (1) comprises from 0 to 10% by volume of oxygen.

7. The process of claim 1, wherein the gas stream provided in step (1) comprises from 0 to 10% by volume of $H_2O$.

8. The process of claim 1, wherein the gas stream provided in step (1) comprises one or more waste gases.

9. The process of claim 1, wherein the gas stream provided in step (1) comprises one or more waste gases from an internal combustion engine.

10. The process of claim 8, wherein the one or more waste gases comprised in the gas stream provided in step (1) have not been subject to a catalytic treatment procedure for the abatement of $N_2O$ and/or $NO_x$ beforehand.

11. The process of claim 1, wherein the contacting of the gas stream with the transition metal containing zeolitic material in step (2) is conducted at a temperature comprised in the range of from 250 to 550° C.

12. The process of claim 1, wherein the contacting of the gas stream with the transition metal containing zeolitic material in step (2) is conducted at a pressure comprised in the range of from 1 to 50 bar.

13. The process of claim 1, wherein the process is a continuous process.

14. The process of claim 1, wherein the contacting is at a pressure of from 2 to 25 bar.

15. The process of claim 1, wherein the contacting is at a pressure of from 4 to 15 bar.

16. The process of claim 1, wherein the stoichiometric ratio of the one or more reducing agents to the one or more nitrogen oxides is in the range of from 0.25 to 5.

17. The process of claim 1, wherein the stoichiometric ratio of the one or more reducing agents to the one or more nitrogen oxides is in the range of from 0.75 to 1.1.

* * * * *

UNITED STATES PATENT AND TRADEMARK OFFICE
CERTIFICATE OF CORRECTION

| | |
|---|---|
| PATENT NO. | : 10,792,614 B2 |
| APPLICATION NO. | : 14/376700 |
| DATED | : October 6, 2020 |
| INVENTOR(S) | : Deuerlein et al. |

It is certified that error appears in the above-identified patent and that said Letters Patent is hereby corrected as shown below:

On the Title Page

Item (51), under "Int. Cl.", Lines 6-7, delete
"*B01J 35/00* (2006.01)
*C01B 39/46* (2006.01)" and insert -- *B01J 35/00* (2006.01) --, therefor.

On Page 2, Column 2, item (56), under "OTHER PUBLICATIONS", Line 4, delete "NOx" and insert -- $NO_x$ --, therefor.

On Page 2, Column 2, item (56), under "OTHER PUBLICATIONS", Line 8, delete "NOx" and insert -- $NO_x$ --, therefor.

On Page 2, Column 2, item (56), under "OTHER PUBLICATIONS", Line 11, delete "al. "$No_x$" and insert -- al., "$NO_x$ --, therefor.

On Page 2, Column 2, item (56), under "OTHER PUBLICATIONS", Line 20, delete "al." and insert -- al., --, therefor.

In the Specification

In Column 1, Line 31, delete "for example" and insert "for example,".

In Column 3, Line 1, delete "NOx" and insert -- $NO_x$ --, therefor.

In Column 3, Line 5, delete "NOx" and insert -- $NO_x$ --, therefor.

In Column 12, Line 46, delete "caprolactame," and insert -- caprolactam, --, therefor.

In Column 22, Line 41, delete "0.6" and insert -- 0.6. --, therefor.

Signed and Sealed this
Thirtieth Day of March, 2021

Drew Hirshfeld
*Performing the Functions and Duties of the
Under Secretary of Commerce for Intellectual Property and
Director of the United States Patent and Trademark Office*

CERTIFICATE OF CORRECTION (continued)
U.S. Pat. No. 10,792,614 B2

In Column 23, Line 31, delete "wt.-%" and insert -- wt.-%. --, therefor.

In Column 31, Line 22, delete "e.g." and insert "e.g.,".

In Column 34, Line 25, delete "wt-%" and insert -- wt.-% --, therefor.

In Column 34, Line 60, delete "wt-%." and insert -- wt.-%. --, therefor.

In Column 35, Line 6, delete "wt-%." and insert -- wt.-%. --, therefor.

In the Claims

In Column 37, Claim 1, Line 53, delete "Process" and insert -- A process --, therefor.

In Column 38, Claim 1, Line 3, delete "C1 to C6" and insert -- $C_1$ to $C_6$ --, therefor.

In Column 38, Claim 1, Line 7, delete "NOx" and insert -- $NO_x$ --, therefor.

In Column 38, Claim 1, Line 8, delete "comprising" and insert -- comprising: --, therefor.

In Column 38, Claim 1, Line 20, delete "$NH_4^+$, and" and insert -- $NH_4^+$, --, therefor.

In Column 38, Claim 1, Line 23, delete "zeolite; and" and insert -- zeolite, and --, therefor.

In Column 38, Claim 1, Line 29, delete "wt %" and insert -- wt.-% --, therefor.